(12) United States Patent
Craig et al.

(10) Patent No.: US 12,083,640 B1
(45) Date of Patent: Sep. 10, 2024

(54) METHODS OF REPAIRING TUBES IN BUNDLED TUBE FUEL INJECTORS

(71) Applicant: GE Infrastructure Technology LLC, Greenville, SC (US)

(72) Inventors: Tiffany M. Craig, Simpsonville, SC (US); Ethan Conrad Schaeffer, Greenville, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/446,631

(22) Filed: Aug. 9, 2023

(51) Int. Cl.
*B23P 6/00* (2006.01)
*F23R 3/28* (2006.01)

(52) U.S. Cl.
CPC .......... *B23P 6/005* (2013.01); *B23P 2700/13* (2013.01); *F23R 3/28* (2013.01)

(58) Field of Classification Search
CPC .......... F23R 3/28; B23P 6/005; B23P 2700/13
See application file for complete search history.

(56) References Cited

U.S. PATENT DOCUMENTS

| | | | |
|---|---|---|---|
| 9,259,807 B2 | 2/2016 | Means et al. | |
| 9,423,134 B2 | 8/2016 | Woods et al. | |
| 9,423,136 B2 | 8/2016 | Bellino et al. | |
| 9,664,392 B2 | 5/2017 | Bellino et al. | |
| 2014/0367495 A1* | 12/2014 | Monaghan | F23R 3/10 239/408 |
| 2015/0167983 A1 | 6/2015 | McConnaughhay et al. | |
| 2022/0196196 A1* | 6/2022 | Worrall | F16L 47/02 |

* cited by examiner

*Primary Examiner* — Moshe Wilensky
(74) *Attorney, Agent, or Firm* — Armstrong Teasdale LLP

(57) ABSTRACT

A method of repairing a fuel injector including a plurality of pre-mix tubes that each extend from a fuel plenum to an outlet portion includes removing the outlet portion from at least one pre-mix tube to define an exposed end portion, machining an inner surface of the at least one pre-mix tube at the exposed end portion to form an increased inner diameter relative to an inner diameter of the pre-mix tube upstream from the exposed end portion, and coupling a tube tip to the exposed end portion.

20 Claims, 12 Drawing Sheets

METHODS OF REPAIRING TUBES IN BUNDLED TUBE FUEL INJECTORS

BACKGROUND

The field of the disclosure relates generally to bundled tube fuel injectors for use in rotary machines and, more particularly, to methods of repairing one or more pre-mix tubes of a bundled tube fuel injector.

Gas turbine engines are widely used in industrial and power generation operations. A conventional gas turbine engine includes a compressor section, a combustor section downstream from the compressor section, and a turbine section downstream from the combustor section. A working fluid, such as ambient air, flows into the compressor section where it is compressed before flowing into the combustor section. The compressed working fluid is mixed with a fuel and burned within the combustor section to generate combustion gases that expand through the turbine section to rotate a shaft producing electricity.

In at least some known gas turbine engines, the combustion section includes one or multiple combustors that are spaced annularly between the compressor section and the turbine section. At least some known combustor designs include one or more axially-extending bundled tube fuel injectors upstream from a combustion chamber. The fuel injectors facilitate mixing the fuel and the compressed working fluid prior to the mixture being channeled towards the combustion chamber. The bundled tube fuel injector typically includes a plurality of pre-mix tubes arranged radially and circumferentially across the fuel injector. The pre-mix tubes extend generally parallel to one another between a fuel distribution module of the bundled tube fuel injector and the combustion chamber.

In operation, the compressed working fluid is routed from the compressor section through inlets of each of the pre-mix tubes, upstream from the fuel distribution module. Fuel is supplied to the fuel distribution module and is injected into the pre-mix tubes through one or more fuel ports. The fuel and compressed working fluid mix inside the pre-mix tubes before being channeled into the combustion chamber. Because the downstream ends of the pre-mix tubes are exposed to extreme temperatures, due to their proximity to the combustion chamber and/or the combustion flame, over time, the downstream ends of the pre-mix tubes may become damaged. Often the damage is the result of thermal stresses and oxidation, and requires scheduled inspection and in some cases, repair of the bundled tube fuel injectors.

Existing methods for repairing bundled tube fuel injectors are limited, however. For example, in some cases, the damaged downstream ends are typically removed and replaced by tube tips that are coupled to the remaining portions of the pre-mix tubes via known techniques including brazing, welding, adhesive cladding, and the like. However, material (e.g., brazing filler material or welding filler material) used to connect the tube tips to the remainder of the pre-mix tubes may accumulate within the pre-mix tubes. Additionally and/or alternatively, because of manufacturing tolerances, some axial offset between a pre-mix tip and corresponding tube tip may exist. Accumulated material within an axial offset between a pre-mix tube and corresponding tube tip may impede or restrict a flow of the fuel-working fluid mixture therethrough. This in-turn may create an opportunity for the combustion flame to become interrupted, which degrades the performance, efficiency, and/or longevity of the combustor.

Accordingly, a need exists for improved methods of repairing damaged tubes in bundled tube fuel injectors. In particular, it would be desirable to repair bundled tube fuel injectors without substantial reconfiguration or redesign of existing pre-mix tubes while also in a manner that facilitates reducing or eliminating any opportunity for the tube tip connections to interrupt combustion flame holding within the combustor.

BRIEF DESCRIPTION

In one aspect, a method of repairing a fuel injector including a plurality of pre-mix tubes that each extend from a fuel plenum to an outlet portion is provided. The method includes removing the outlet portion from at least one pre-mix tube to define an exposed end portion; machining an inner surface of the at least one pre-mix tube at the exposed end portion to form an increased inner diameter relative to an inner diameter of the pre-mix tube upstream from the exposed end portion; and coupling a tube tip to the exposed end portion.

In another aspect, a method of repairing a fuel injector having a plurality of pre-mix tubes that each extend downstream from a fuel plenum to an outlet portion is provided. The method includes removing the outlet portion from a pre-mix tube to define an exposed end portion; machining an inner surface of the pre-mix tube at the exposed end portion to produce an inwardly-tapering machined surface that has a greater inner diameter at the exposed end portion than an inner diameter upstream from the exposed end portion; and coupling a tube tip to the exposed end portion to create a junction between the tube tip and the exposed end portion, wherein the tube tip has an inwardly-tapering surface that extends between the junction and an inner surface of the tube tip, and wherein the inwardly-tapering surface of the tube tip complements the inwardly-tapering machined surface to define a larger inner diameter at the junction.

In another aspect, a method of repairing a fuel injector including a plurality of pre-mix tubes that each extend from a fuel plenum to an outlet portion is provided. The method includes removing the outlet portions from the plurality of pre-mix tubes along a cut line to define exposed end portions of the plurality of pre-mix tubes; machining an inner surface of each pre-mix tube at the exposed end portion to form an increased inner diameter relative to an inner diameter of the pre-mix tube upstream from the exposed end portion; and coupling a tube tip to each exposed end portion.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Corresponding reference characters used throughout the drawings indicate corresponding parts.

Figure 1:
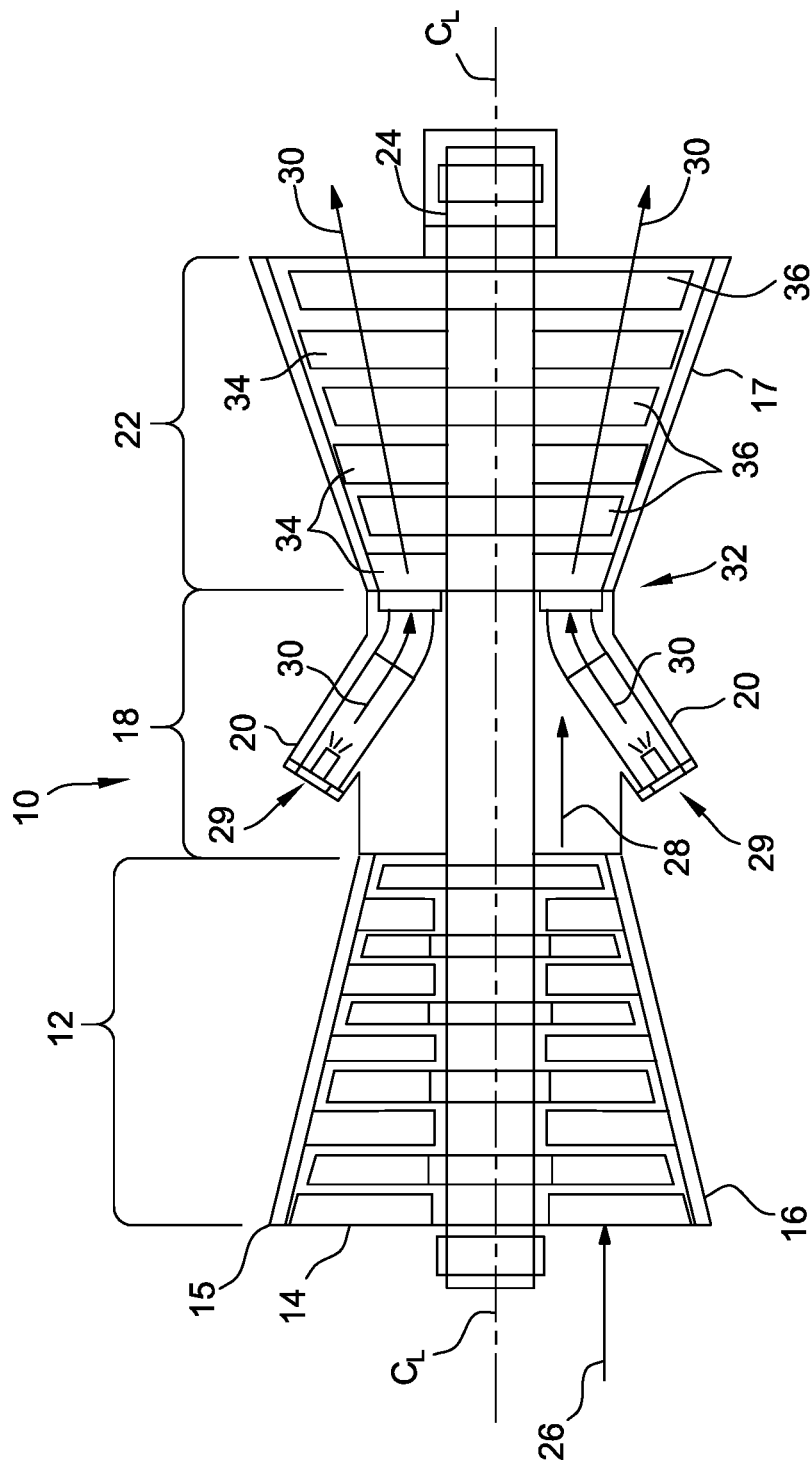
FIG. 1 is a schematic illustration of an exemplary gas turbine system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The embodiments described herein relate to methods of repairing a bundled tube fuel injector used in combustors of rotary machines (e.g., gas turbine engines). An exemplary fuel injector includes a plurality of pre-mix tubes extending between a fuel plenum and an outlet portion. Fuel is injected into each pre-mix tube in the fuel plenum and the fuel mixes with a compressed working fluid within the pre-mix tubes to form a combustible mixture. The outlet portions of the pre-mix tubes define outlets through which the combustible mixture is channeled towards a combustion chamber. The outlet portions of the pre-mix tubes are exposed to extreme temperatures and high mechanical loads during combustion which over time may cause the outlet portions to become damaged due to thermal stresses and oxidation, for example. The methods described herein include removing damaged outlet portions of one or more of the pre-mix tubes, and replacing each removed outlet portions with a tube tip to repair or refurbish the pre-mix tube(s).

A connection created between the tube tip and the pre-mix tube may promote an impediment or restriction in the flow of the combustible mixture therethrough which may interrupt the combustion flame within the combustion chamber and/or degrade flame holding within the combustor. For example, the tube tip may be coupled to the pre-mix tube via brazing, welding, adhesive cladding, and the like, and any filler material used to join the components may undesirably accumulate within the pre-mix tube and/or tube tip. The accumulated material may impede or restrict flow, or may otherwise create flow perturbations of the combustible mixture. Moreover, because of manufacturing tolerances, the pre-mix tube and the tube tip may be operating with some offset in the axial alignment therebetween, which may impede or restrict the flow, or otherwise create flow perturbations of the combustible mixture.

The exemplary methods described herein include machining an exposed end portion of the pre-mix tube after removing the damaged outlet portion to produce a suitable configuration of the pre-mix tube that facilitates reducing or eliminating the opportunity for the connection between the pre-mix tube and the tube tip to impede or restrict the flow of the combustible mixture therethrough. For example, at the exposed end to which the tube tip is attached, the pre-mix tube may be machined to an increased diameter that provides additional interior space for filler material used to couple the tube tip and the pre-mix tube to accumulate, without the accumulation creating an obstacle for the combustible mixture flowing through the pre-mix tube and tube tip. The increased diameter also facilitates reducing or eliminating any negative effect that an offset in the axial alignment between the pre-mix tube and tube tip may otherwise create on the flow of the combustible mixture therethrough. As such, pre-mix tubes may be repaired or refurbished with a corresponding tube tip in a manner that maintains the performance, efficiency, and/or longevity of the combustor.

When introducing elements of various embodiments disclosed herein, the articles "a," "an," "the," and "said" are intended to mean that there are one or more of the elements and include plural references unless the context clearly dictates otherwise. "Optional" or "optionally" means that the subsequently described event or circumstance may or may not occur, and that the description includes instances where the event occurs and instances where it does not. Furthermore, references to "one embodiment" are not intended to be interpreted as excluding the existence of additional embodiments that also incorporate the recited features. Moreover, unless explicitly stated to the contrary, the terms "comprising," "including," and "having" are intended to be inclusive and mean that there may be additional elements other than the listed elements.

Unless otherwise indicated, approximating language, such as "generally," "substantially," "approximately," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value.

Unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The terms "upstream" and "downstream" refer to the relative direction with respect to fluid flow in a fluid pathway. For example, "upstream" refers to the direction from which the fluid flows, and "downstream" refers to the direction to which the fluid flows. Directional terms such as "radially," "axially," "circumferentially," "forward," and "aft" are used solely for ease of description and are not limiting to any particular orientation unless the context clearly indicates otherwise.

Referring now to the drawings, FIG. 1 is a schematic cross-sectional view of an exemplary gas turbine engine 10. The gas turbine engine 10 includes a compressor section 12 including an inlet 14 defined at an upstream end 15 of the gas turbine engine 10, and a casing 16 that at least partially circumscribes the compressor section 12. The gas turbine engine 10 also includes a combustion section 18 including a combustor 20 downstream from the compressor section 12, and a turbine section 22 downstream from the combustion section 18. An outer casing 17 at least partially circumscribes the turbine section 22. A rotor shaft 24 extends axially through the gas turbine engine 10. The combustion section 18 may include a plurality of combustors 20.

In operation of the gas turbine engine 10, working fluid (e.g., air) 26 is drawn into the inlet 14 of the compressor section 12 and is progressively compressed to provide compressed working fluid 28 to the combustion section 18. The compressed working fluid 28 flows into the combustion section 18 and is mixed with fuel 29 in the combustor 20 to form a combustible mixture. The combustible mixture is burned in the combustor 20, thereby generating a hot gas 30 that flows from the combustor 20 into the turbine section 22 across a first stage 32 of turbine nozzles 34 and turbine blades 36. The hot gas 30 rapidly expands as it flows through alternating stages (e.g., the first stage 32 and a second stage 33 downstream from the first stage 32) of turbine blades 36 and turbine nozzles 34 coupled within the turbine section 22 along an axial centerline $C_L$ of the shaft 24. Thermal and/or kinetic energy is transferred from the hot gas to each stage of the turbine blades 36, thereby causing the shaft 24 to rotate and produce mechanical work. The shaft 24 may be coupled to a load such as a generator (not shown) to produce electricity. In addition, or in the alternative, the shaft 24 may be used to drive the compressor section 12 of the gas turbine engine 10.

Figure 2:
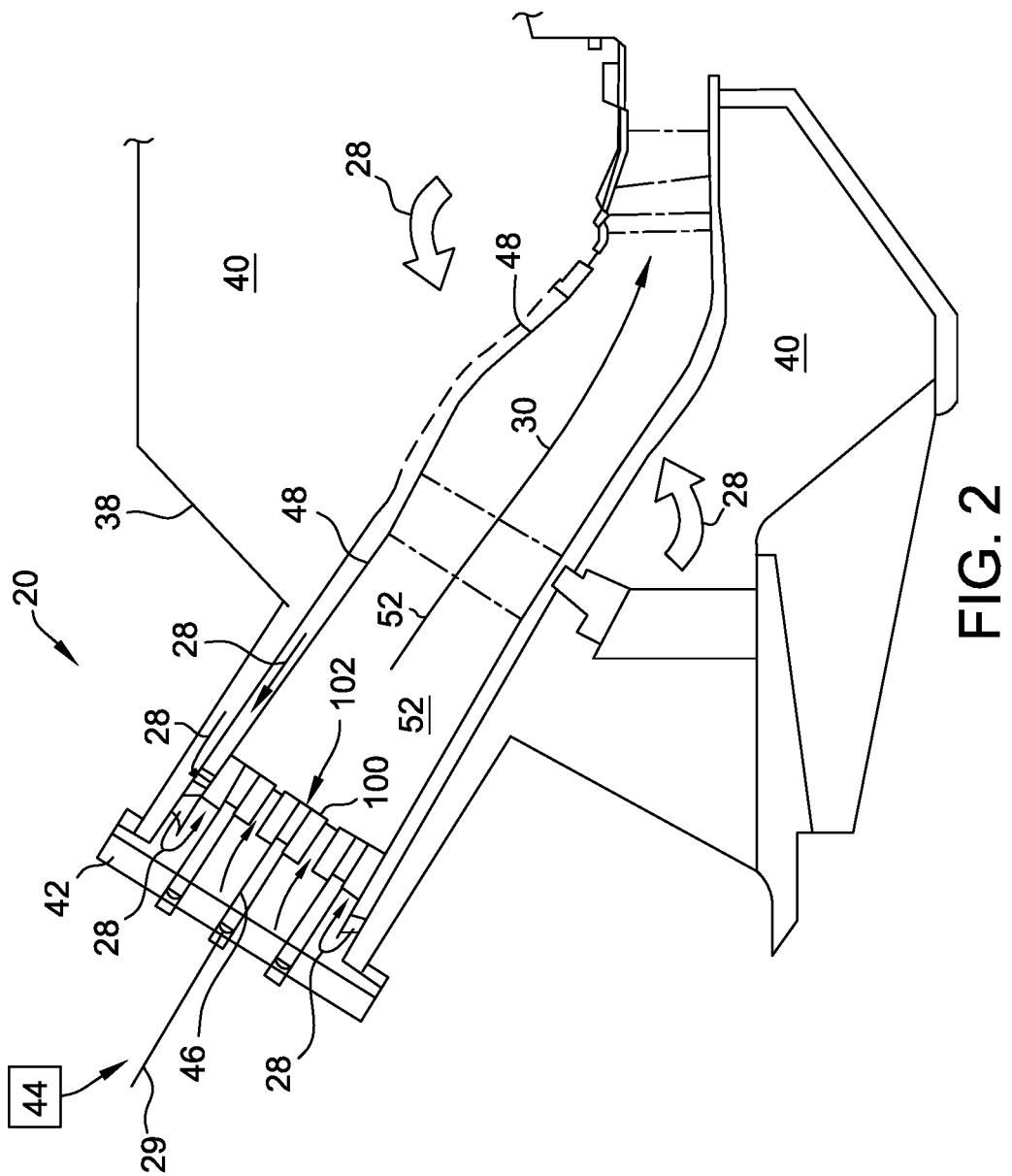
FIG. 2 is a simplified cross-sectional side view of an exemplary combustor included in the gas turbine engine of FIG. 1.

FIG. 2 is a simplified cross-sectional side view of the combustor 20 included in the gas turbine engine 10 (FIG. 1). The combustor 20 includes an exemplary bundled tube fuel injector 100. The combustor 20 is at least partially circumscribed by an outer casing 38. The outer casing 38 at least partially forms a high pressure plenum 40 around the combustor 20. The high pressure plenum 40 may be in fluid communication with the compressor section 12 (FIG. 1) or other source for supplying the compressed working fluid 28 to the combustion section 18. An end cover 42 is coupled to the outer casing 38. The end cover 42 may be in fluid communication with a fuel supply 44 that channels the fuel 29 towards the combustion section 18.

The bundled tube fuel injector 100 extends downstream from the end cover 42, and may be fluidly connected to the end cover 42. The fuel injector 100 receives fuel 29 from the fuel supply 44, and a fluid conduit 46 may fluidly couple the end cover 42 and/or the fuel supply 44, with the bundled tube fuel injector 100. One end of an annular liner 48, such as a combustion liner and/or a transition duct, surrounds a downstream end 102 of the bundled tube fuel injector 100 and at least partially defines a combustion chamber 50 within the combustor 20. The liner 48 at least partially defines a hot gas path 52 that directs the hot gas 30 from the combustion chamber 50 through the combustor 20. The hot gas path 52 may channel the hot gas 30 towards the turbine section 22.

In operation of the combustor 20, the compressed working fluid 28 is channeled towards the end cover 42 where it reverses direction and flows through one or more of the bundled tube fuel injectors 100. The fuel 29 is supplied to the bundled tube fuel injector(s) 100, wherein the fuel 29 and the compressed working fluid 28 are premixed or combined into a combustible mixture within the bundled tube fuel injector(s) 100 before the mixture is injected into the combustion chamber 50 for combustion.

Figure 3:
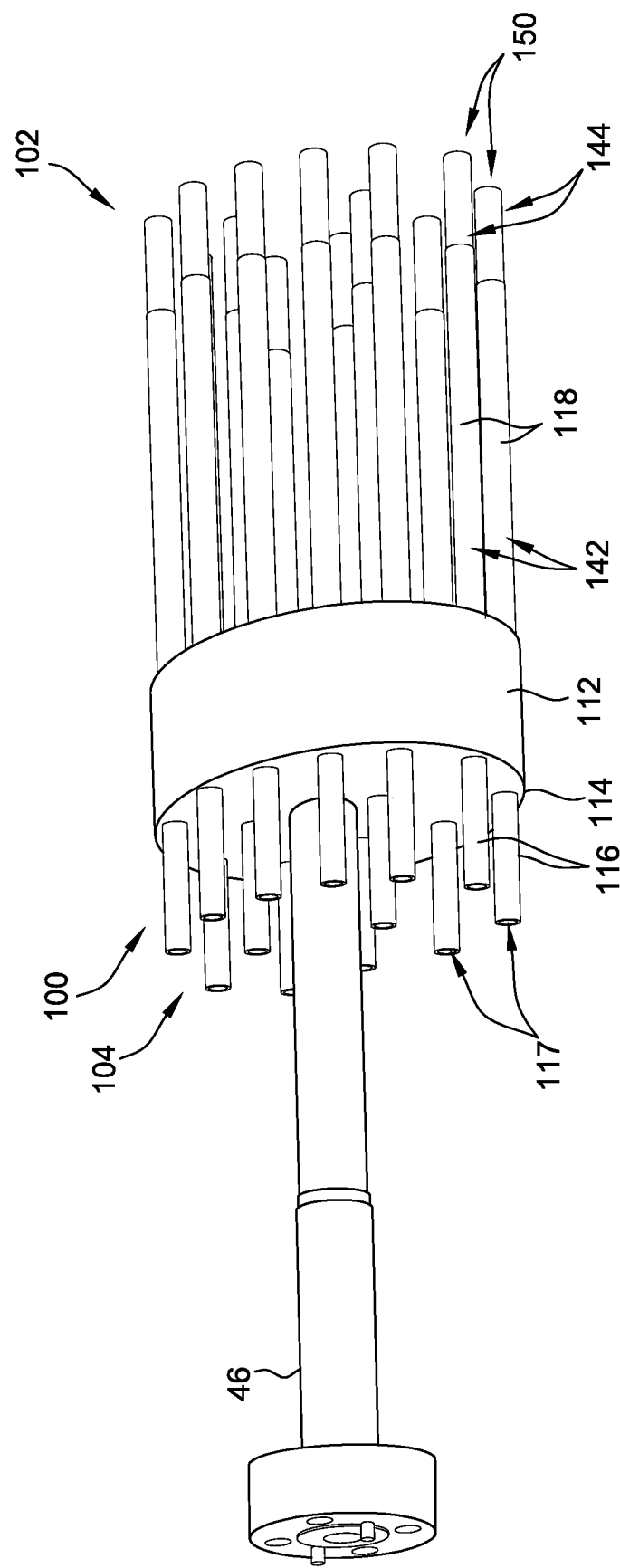
FIG. 3 is a perspective view of an exemplary bundled tube fuel injector included in the combustor of FIG. 2.
Figure 4:
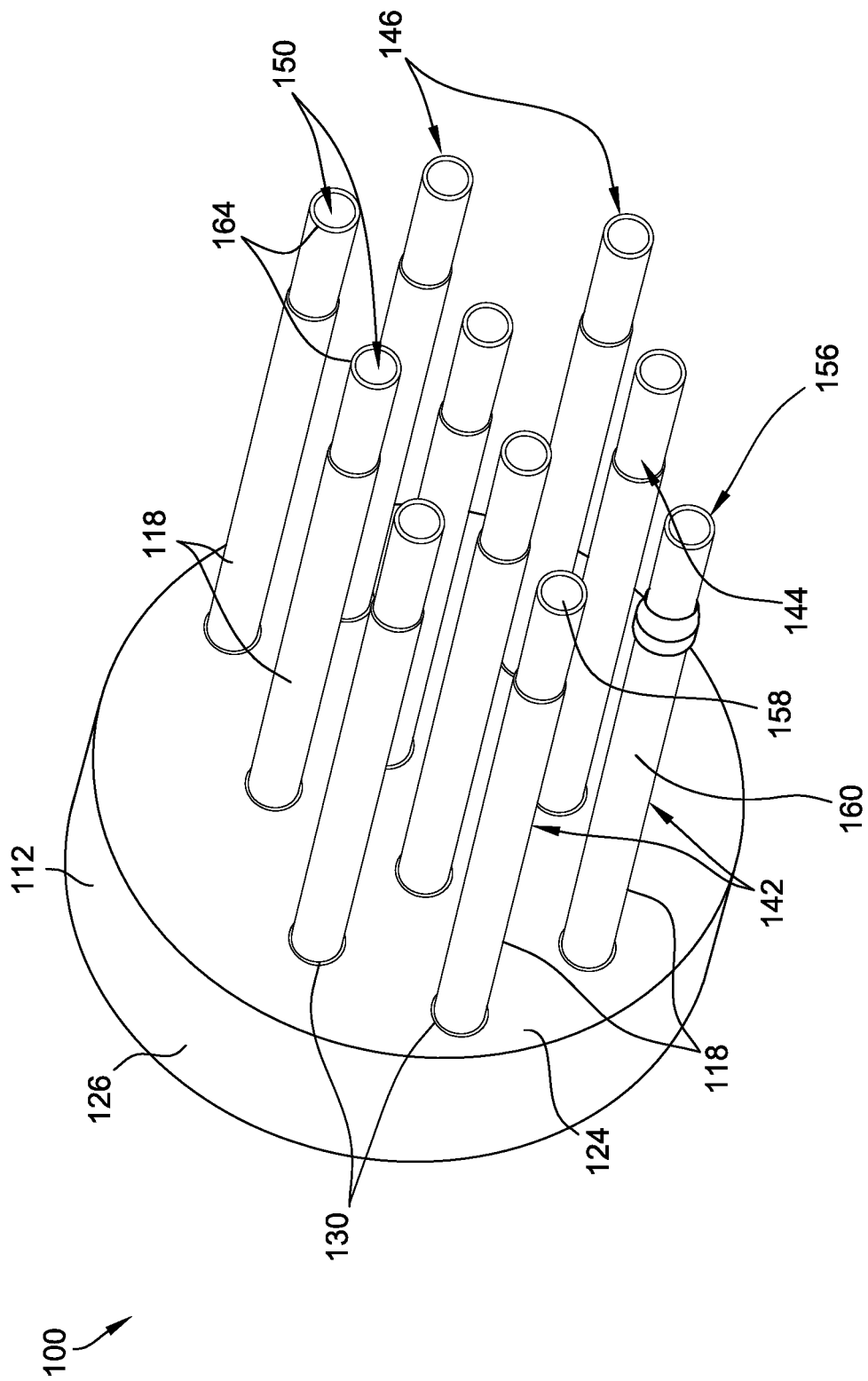
FIG. 4 is a rear perspective view of the fuel injector shown in FIG. 2.
Figure 5:
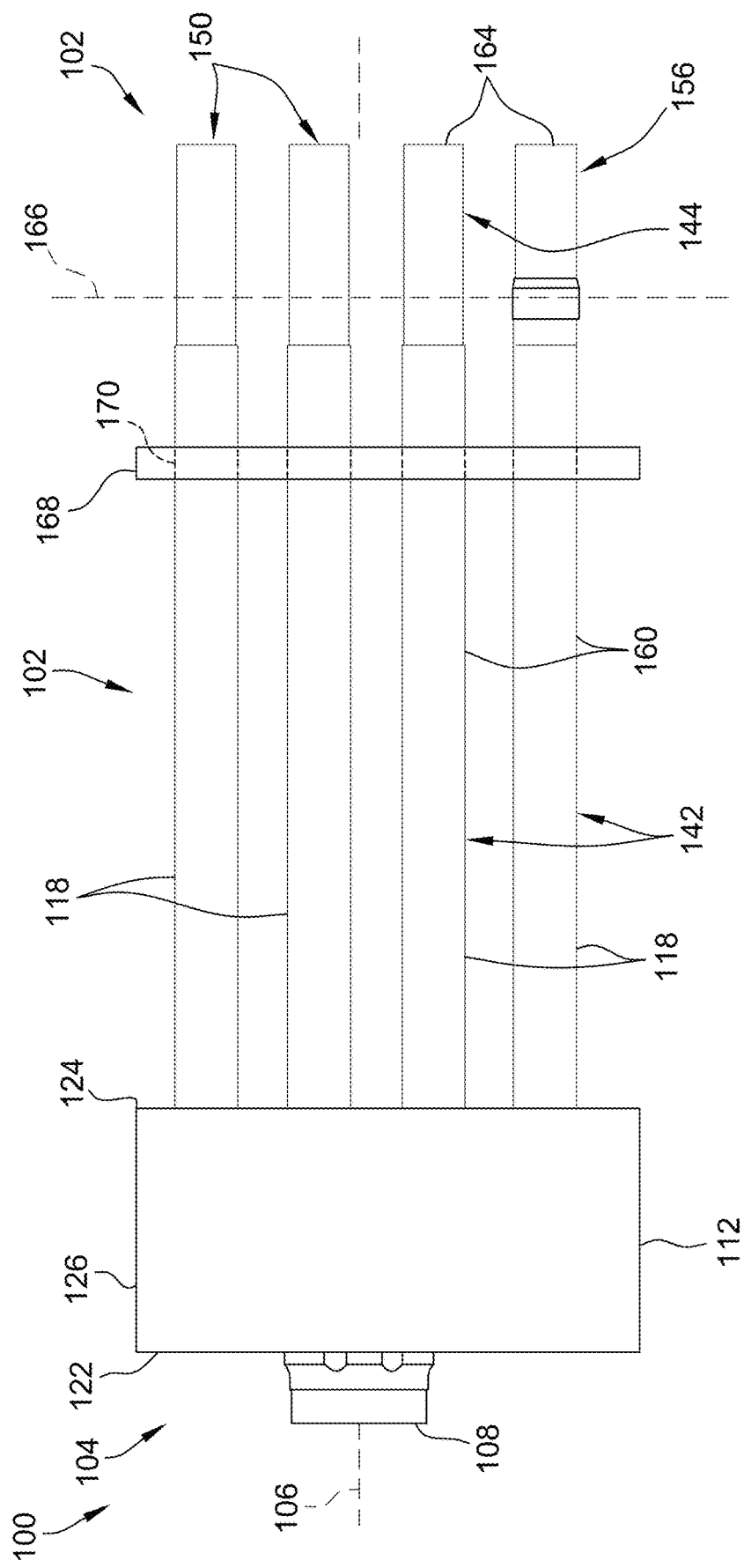
FIG. 5 is a side view of the fuel injector shown in FIG. 2.
Figure 6:
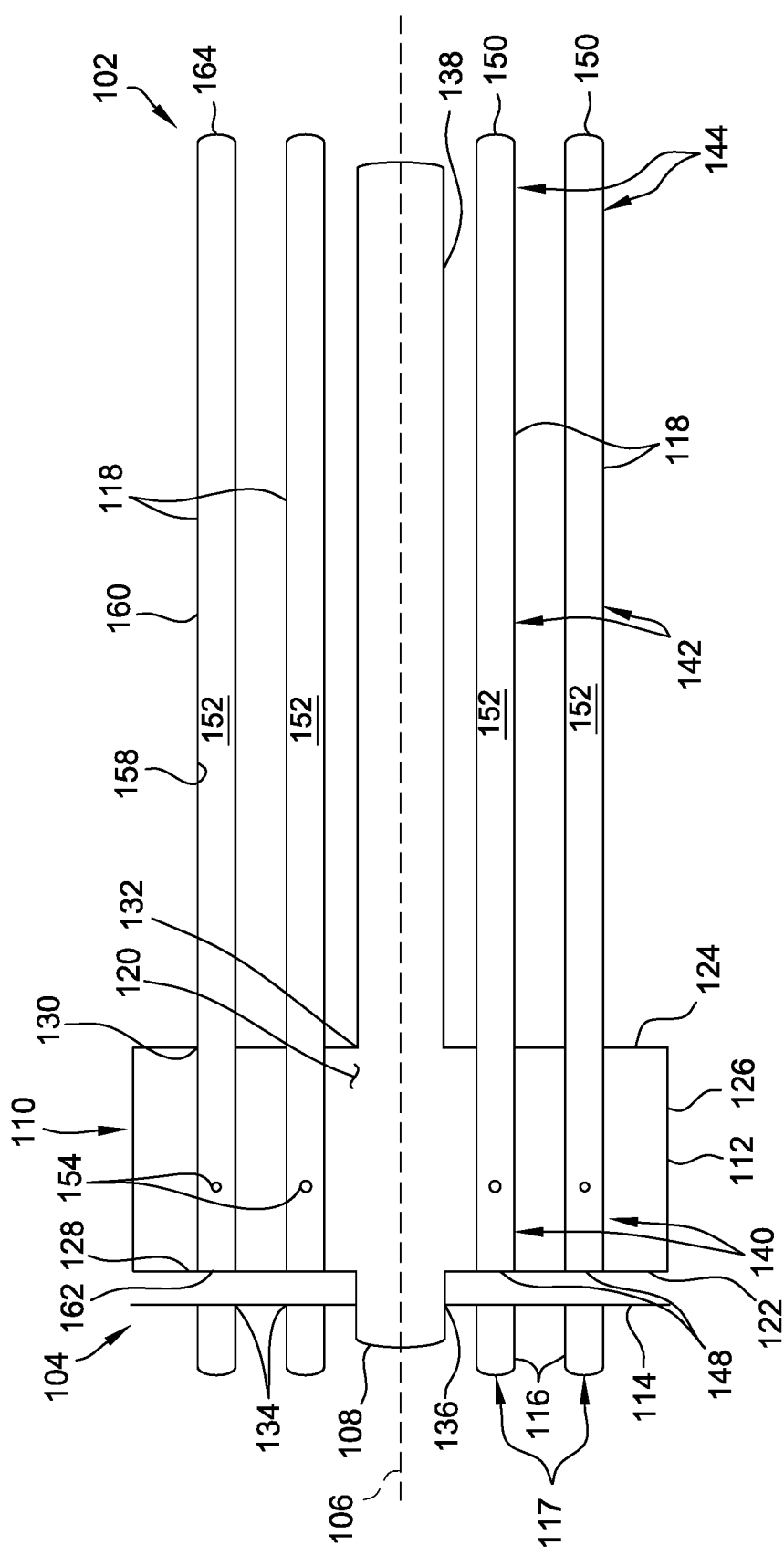
FIG. 6 is a schematic cross-sectional side view of the fuel injector shown in FIG. 2.

Referring to FIGS. 3-6, various views of the exemplary bundled tube fuel injector 100 are shown. The fuel injector 100 is shown simplified in FIGS. 3-6 for ease of illustration and description. FIG. 3 is a perspective view of the fuel injector 100 shown coupled to the fluid conduit 46. FIG. 4 is a rear perspective view of the fuel injector 100. FIG. 5 is a side view of the fuel injector 100, and FIG. 6 is a schematic cross-sectional side view of the fuel injector 100.

In the exemplary embodiment, the fuel injector 100 extends axially between an upstream end 104 and a downstream end 102 and defines an axial centerline 106. The fuel injector 100 includes a fuel inlet 108 at the upstream end 104 that provides fluid communication between the fuel supply 44 (FIG. 2) and a fuel distribution module 110 via the fluid conduit 46. The fuel distribution module 110 includes a shroud 112 that defines a fuel plenum 120 (shown in FIG. 6) therein. The fluid conduit 46 and the fuel inlet 108 provide fluid communication between the fuel supply 44 (FIG. 2) and the fuel plenum 120. The fuel injector 100 also includes a support plate 114 that is upstream from the shroud 112. For simplicity, the support plate 114 is omitted from FIGS. 4 and 5. The support plate 114 provides a plurality of inlet tubes 116 that extend axially outwardly from the support plate 114, opposite the shroud 112. Each inlet tube 116 is substantially axially-aligned with one of a bundle of pre-mix tubes 118 that extend axially through and outwardly from the shroud 112, opposite the support plate 114.

As shown in FIG. 6, the shroud 112 includes a pair of axially spaced-apart first and second plates 122 and 124 that extend generally radially outwardly and circumferentially with respect to the axial centerline 106 of the fuel injector 100. The first and second plates 122 and 124 define the fuel plenum 120 therebetween. An outer band 126 extends axially between the first and second plates 122 and 124 and circumferentially encloses the fuel plenum 120. Each of the first and second plates 122 and 124 includes tube passages 128 and 130 respectively, defined therein. Each tube passage 128 defined in the first plate 122 is in axial alignment with a tube passage 130 defined in the second plate 124 to enable a portion of one of the bundle of pre-mix tubes 118 to extend therethrough. The fuel inlet 108 extends axially outward from the first plate 122. The second plate 124 includes a center nozzle passage 132 extending axially therethrough. The fuel inlet 108 and the center nozzle passage 132 are in axial alignment along the axial centerline 106 of the fuel injector 100. The fuel inlet 108 provides access to the fuel plenum 120 through the first plate 122 and the center nozzle passage 132 provides access to the fuel plenum 120 through the second plate 124.

The support plate 114 extends radially outwardly and circumferentially with respect to the axial centerline 106 of the fuel injector 100 and is adjacent to the first support plate 122 of the shroud 112 at the upstream end 104 of the fuel injector 100. The support plate 114 is shown axially-spaced from the first plate 122 of the shroud 112 in FIG. 6 for ease of illustration. When the fuel injector 100 is assembled (as shown in FIG. 3), the support plate 114 is adjacent to, and may abut and/or may be coupled to, the first plate 122. The support plate 114 may be coupled to the shroud first plate 122 via any suitable means (e.g., welding, brazing, mechanical fasteners, and the like). In certain embodiments, the support plate 114 is removably coupled (e.g., using fasteners) to the first plate 122.

The support plate 114 includes the inlet tubes 116 extending from corresponding tube passages 134 defined in the support plate 114. The inlet tubes 116 each include an open inlet end 117 that is in communication with a corresponding tube passage 134. Each tube passage 134 defined in the support plate 114 is substantially axial-aligned with a tube passage 128 defined in the first plate 122 to provide fluid communication between the inlet tubes 116 and corresponding pre-mix tubes 118. The support plate 114 also includes a center fuel inlet passage 136 that extends axially therethrough. The center fuel inlet passage 136 is substantially axially-aligned with, and receives, the fuel inlet 108. The fluid conduit 46 (FIG. 3) may be coupled to the fuel inlet 108 and/or to the center nozzle passage 132 to provide fluid communication between the end cover 42 and/or the fuel supply 44 (FIG. 2) and the fuel plenum 120. The fuel inlet 108, the center nozzle passage 132 of the second plate 124, and the center nozzle passage 136 of the support plate 114 are each substantially axially-aligned along the axial centerline 106 of the fuel injector 100. A fluid cartridge or fuel nozzle 138 may be coupled to the center nozzle passage 132 and extend axially outwardly from the shroud 112 towards the combustion chamber 50 (FIG. 2).

The pre-mix tubes 118 extend generally parallel to one another along, or substantially parallel to the axial centerline 106 of the fuel injector 100. The pre-mix tubes 118 extend axially from the first plate 122 of the shroud 112, through the second plate 124 and towards the combustion chamber 50 (FIG. 2). In particular, a first or inlet portion 140 of each pre-mix tube 118 extends through the fuel plenum 120 between the first plate 122 and the second plate 124. Similarly, a second or intermediate portion 142 of each pre-mix tube 118 extends axially outwardly from the second plate 124, and a third or outlet portion 144 of each pre-mix tube 118 extends axially outwardly from the intermediate portion 142 towards the combustion chamber 50. Each pre-mix tube 118 is arranged or seated within axially-aligning tube passages 128 and 130 of the shroud 112. The intermediate and outlet portions 142, 144 of the pre-mix tubes 118 may "float," that is, the tubes 118 may extend from the shroud 112 without any additional support fixture downstream from the shroud 112. In other embodiments, a downstream support plate (not shown) may support the tube passages that each receive the intermediate and/or outlet portions 142 and 144 of corresponding pre-mix tubes 118 and limit movement thereof in response to vibrations and/or mechanical loads during operation of the combustor 20.

The pre-mix tubes 118 may be formed from a single continuous tube or may be formed from two or more co-axially aligned tubes securely coupled together (e.g., by brazing, welding, or another suitable means). Although generally illustrated as cylindrical, the pre-mix tubes 118 may be any other geometric shape, and the pre-mix tubes 118 are not limited to having any particular cross-sectional shape unless the context clearly indicates otherwise. In addition, the pre-mix tubes 118 may be grouped or arranged in circular, triangular, square, or other geometric shapes, and may be arranged in various numbers and geometries.

Any number of the pre-mix tubes 118 may be included in the fuel injector 100, and the pre-mix tubes 118 may be arranged in any suitable arrangement. As shown in FIG. 4, the pre-mix tubes 118 are arranged in multiple rows 146. Each row 146 may include one or more of the pre-mix tubes 118. In one embodiment, each row 146 is radially spaced with respect to the axial centerline 106 from an adjacent row 146. The pre-mix tubes 118 of at least some of the rows 146 may be arranged annularly or in an arcuate manner relative to the axial centerline 106. Additionally and/or alternatively, the pre-mix tubes 118 of at least some of the rows 146 may be arranged linearly and generally perpendicular to the axial centerline 106 of the fuel injector 100.

Each pre-mix tube 118 includes an inlet 148 defined in the inlet portion 140 and that is upstream from the fuel plenum 120. The inlets are substantially axially-aligned with the tube passages 128 in the shroud first plate 122 and, thereby, with corresponding tube passages 134 and inlet tubes 116 of the support plate 114. The inlets 117 of the inlet tubes 116 provide fluid communication between the inlets 148 of the corresponding pre-mix tubes 118 and the high pressure plenum 40 (FIG. 2) and/or the compressor section 12 (FIG. 1). Each pre-mix tube 118 also includes an outlet 150 defined in the outlet portion 144 and downstream from the fuel plenum 120. The outlet 150 of each pre-mix tube 118 is in fluid communication with the combustion chamber 50 (FIG. 2). A tube channel 152 extends a distance between the inlet 148 and the outlet 150 of each pre-mix tube 118. Each pre-mix tube 118 includes an inner surface 158 that defines an inner diameter (e.g., an inner diameter $D_1$, shown in FIGS. 7-9 and 11) of the tube channel 152 and an outer surface 160 that defines on outer diameter (e.g., an outer diameter $D_3$, shown in FIGS. 7-9 and 11) of the pre-mix tube 118. Opposing end surfaces 162, 164 of the pre-mix tube 118 extend radially between, and join, the inner surface 158 and the outer surface 160 adjacent the inlet 148 and the outlet 150, respectively.

In the exemplary fuel injector 100, the pre-mix tubes 118 are substantially axially coextensive with one another such that the end surfaces 164 are aligned substantially flush with each other at the downstream end 102 of the fuel injector 100. In other embodiments, the pre-mix tubes 118 may have different axial lengths, and some of the end surfaces 164 may extend beyond the other end surfaces 164 at the downstream end 102. The inner diameter $D_1$ and the outer diameter $D_3$ may be substantially constant along the full axial length of the pre-mix tube 118 such that the end surfaces 162 and 164 have approximately the same radial distance between the inner and outer surfaces 158, 160, respectively. Alternatively, the inner diameter $D_1$ and/or the outer diameter $D_3$ may vary along the axial length of the pre-mix tube 118 such that the respective end surfaces 162 and 164 define different radial distances between the inner and outer surfaces 158, 160, respectively. One or more fuel ports 154 are defined in the inlet portion 140 of each pre-mix tube 118 downstream from the inlet 148. The fuel port(s) 154 extend radially through the inner and outer surfaces 158 and 160 of the pre-mix tube 118. The fuel ports 154 provide fluid communication between the fuel plenum 120 and a corresponding pre-mix tube channel 152 within the pre-mix tubes 118.

During operation, the compressed working fluid 28 flows through the high pressure plenum 40 and is channeled towards the upstream end 104 of the fuel injector 100 and into the inlets 117 of the inlet tubes 116. The compressed working fluid 28 is channeled through the inlet tubes 116 towards the inlets 148 of the pre-mix tubes 118. The fuel 29 is channeled into the fuel plenum 120 via the fuel inlet 108. The fuel 29 in the fuel plenum 120 is injected into the pre-mix tubes 118 via the corresponding fuel ports 154. The compressed working fluid 28 and the fuel 29 are mixed within the tube channels 152 and the resulting combustible mixture exits each pre-mix tube 118 via the outlets 150. The combustible mixture is subsequently injected into the combustion chamber 50 for combustion. Some of the fuel 29 that enters the fuel plenum 120 may be routed towards the combustion chamber 50 through the fuel nozzle 138 extending from the center nozzle passage 132. That is, by design, some of the fuel 29 supplied to the fuel injector 100 may by-pass the pre-mix tubes 118 and be directly mixed with the combustible mixture exiting the fuel injector 100 within the combustion chamber 50.

The outlet portions 144 of the pre-mix tubes 118, as compared to the other portions of the pre-mix tubes 118, are generally exposed to higher temperatures and higher mechanical loads due to their proximity to the combustion chamber 50 and/or a combustion flame. This may increase the likelihood for the outlet portions 144 to become damaged over time due to prolonged exposure to thermal stresses and oxidation, for example. To repair or refurbish damaged outlet portions 144 of the pre-mix tubes 118, the damaged outlet portions 144 may at least partially be removed using any suitable means that enables cutting or otherwise removing tubing. For example, the damaged outlet portions 144 of the pre-mix tubes 118 may (at least partially) be removed using scoring, electrical discharge machining (EDM), torch cutting, a cutting blade, and the like. In some embodiments, the outlet portions 144 of each of the pre-mix tubes 118 may at least partially be removed in a single cutting operation in which the outlet portions 144 of the pre-mix tubes 118 are at least partially removed along a cut line 166 (shown in FIG. 5) that is generally perpendicular to the axial length of the pre-mix tubes 118 and the axial centerline 106 of the fuel injector 100. In other embodiments, the outlet portions 144 of one or some of the pre-mix tubes 118 may be at least partially removed individually while the outlet portions 144 of other pre-mix tubes 118 are not removed.

Removing the damaged outlet portions 144 and further machining of the pre-mix tube(s) 118 during and/or after removing the damaged outlet portions 144 (described further below) may increase the risk of additional damage to the pre-mix tubes 118 as a result of vibrational and mechanical loads induced by the cutting and/or machining operations. As described above, in some embodiments, the intermediate and outlet portions 142, 144, respectively, of the pre-mix tubes 118 may float and may not be supported by any additional support fixture provided downstream from the shroud 112. A temporary support plate 168 (FIG. 5) may be provided with tube passages 170 sized to receive some or all the pre-mix tubes 118 to provide temporary support to the intermediate and/or outlet portions 142, 144, respectively, of the pre-mix tubes 118 and to facilitate restraining the tubes 118 against movement thereof in response to vibrations and/or mechanical loads during cutting and/or machining operations when repairing or refurbishing the pre-mix tubes 118. In embodiments where the outlet portions 144 of each of the pre-mix tubes 118 are at least partially removed in a single cutting operation along the cut line 166 (FIG. 5), the temporary support plate 168 may suitably include tube passages 170 to receive and support all the pre-mix tubes 118. In embodiments where the outlet portions 144 of one or some, and less than all, the pre-mix tubes 118 are at least partially removed individually while the outlet portions 144 of other pre-mix tubes 118 are not removed, the temporary support plate 168 may suitably include a limited number of tube passages 12 that receive and support the pre-mix tubes 118 within a pre-defined or preselected vicinity of the pre-mix tube 118 individually being cut and/or machined.

The removed outlet portions 144 of the one or more of the pre-mix tubes 118 may then be replaced with a tube tip 156 (shown in FIGS. 4 and 5) to complete the repair or refurbishment of the pre-mix tube(s) 118. The tube tip(s) 156 may be fixedly secured or coupled to the remaining portion of the pre-mix tubes 118 using any suitable means for joining tubing. For example, the tube tip(s) 156 may be fixedly coupled to the remaining portion of the pre-mix tubes 118 via furnace brazing, induction brazing, orbital welding, laser welding, friction welding, electron beam welding, diffusion bonding, plasma spraying, thermally resistant adhesive, adhesive cladding, high velocity oxy-fuel coating spraying, and/or any combination thereof, and/or any other coupling technique that enables the tubes 118 to be repaired as described herein. The pre-mix tube(s) 118 that include the tube tip(s) 156 suitably extend the same axial length following repair, as prior to the removal of the damaged outlet portion 144. In embodiments where the pre-mix tubes 118 are aligned substantially co-extensive with one another, as described above, the tube tip(s) 156 suitably retain the co-extensive extent such that the tube tip(s) 156 that define the end surface(s) are substantially flush with the end surfaces 164 of the other (i.e., non-repaired) pre-mix tubes 118. In embodiments where the outlet portions 144 are collectively removed along the cut line 166 (FIG. 5), the tube tips 156 that replace the removed outlet portions 144 may be aligned substantially co-extensive and define end surfaces that are substantially flush with one another.

The tube tip(s) 156 may be made fabricated from a dissimilar material (e.g., a dissimilar metal or metal alloy) as the remaining portion of the repaired or refurbished pre-mix tube(s) 118. In some examples, the tube tip(s) 156 may include at least one of nickel, cobalt, chromium, molybdenum, stainless steel, aluminum and/or titanium based alloys. The tube tip(s) 156 may suitably be made of a high temperature-resistant metal or metal alloy. Because the tube tip(s) 156 form only a portion of the repair or refurbished pre-mix tubes 118, the tube tip(s) 156 may be made of relatively expensive materials that are suitable for high or extreme temperatures and may not be practical and/or cost-effective for use in forming the entirety of the pre-mix tubes 118. In some embodiments, the tube tip(s) 156 may include a similar metal or metal alloy as used in fabricating the remaining portion of the repaired or refurbished pre-mix tube(s) 118. For example, each of the tube tip(s) 156 and the pre-mix tubes 118 may be fabricated from at least one of nickel, cobalt, chromium, or tungsten based alloys. In some embodiments, each of the tube tip(s) 156 and the pre-mix tubes 118 include a cobalt-nickel-chromium-tungsten alloy, such as Haynes® 188 Alloy.

The tube tip(s) 156 may include a wear coating (not shown) that may provide or enhance oxidation and corrosion performance of the tube tip 156. A wear coating may be applied to the tube tip(s) 156 via plating, coating, etc. In some embodiments, the wear coating may be one of, but is not limited to only being, one of, chrome, nickel, gel aluminide coating, aluminide coating, TBC, L605 and/or Stellite 6. The wear coating may be applied using any process and/or in any manner known to one of ordinary skill, including but not limited to Electron Beam Physical Vapor Deposition (EBPVD), Air Plasma Spray (APS), High Velocity Oxygen Fuel (HVOF), Electrostatic Spray Assisted Vapor Deposition (ESAVD) and/or Direct Vapor Deposition (DVD).

The tube tips(s) 156 may be formed using any suitable manufacturing technique. For example, the tube tip(s) 156 may be formed using casting, molding, cold-forming (e.g., cold-rolling), extrusion processing, powder metal manufacturing, additive manufacturing or 3D printing, and/or computer machining (e.g., computer numerical control machining). In particular embodiments, the tube tip(s) 156 may be additively manufactured as an individual component. As used herein, the term "additively manufactured" or "additive manufacturing process" corresponds but is not limited to various known 3D printing manufacturing methods such as Extrusion Deposition, Wire, Granular Materials Binding, Powder Bed and Inkjet Head 3D Printing, Lamination and Photopolymerization. The various technologies related to the various 3D printing methods include but are not limited to unless recited in the claims, fused deposition modeling (FDM), electron beam free-from fabrication (EBF), direct metal laser sintering (DMLS), Electron Beam Melting (EBM), Selective Laser Melting (SLM), Selective Heat Sintering (SHS), Selective Laser Sintering (SLS), Plaster-based 3D Printing (PP), Laminated Object Manufacturing (LOM), Stereolithography (SLA) and Digital Light Processing (DLP).

Figure 7:
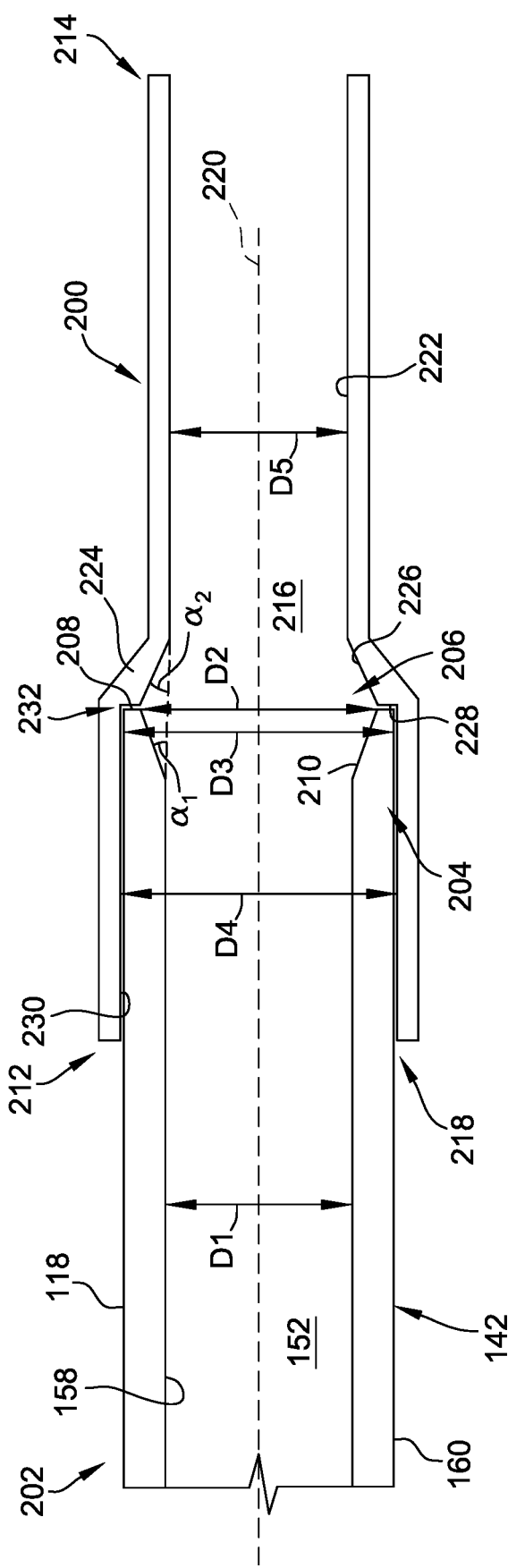
FIG. 7 is an enlarged cross-sectional side view of an exemplary tube tip fixedly coupled to a remaining portion of a pre-mix tube of the fuel injector after removal and machining operations.

FIG. 7 is an enlarged cross-sectional side view of an exemplary tube tip 200 fixedly coupled to a remaining portion 202 of a pre-mix tube 118. The tube tip may be incorporated as one or more of the tube tip(s) 156 shown in FIGS. 4 and 5. The remaining portion 202 is that portion of the pre-mix tube 118 that remains within the combustor 20 after a damaged outlet portion 144 has at least partially been removed to initiate repair or refurbishment of the pre-mix tube 118. For ease of description, the remaining portion 202 of the pre-mix tube 118 may also be referred to as a pre-mix tube 202. The pre-mix tube 202 includes an exposed end portion 204 to which the tube tip 200 is fixedly secured or coupled. The end portion 204 extends substantially axially from the intermediate portion 142 to an open end 206 of the pre-mix tube 202. The tube channel 152 of the pre-mix tube 202 extends between the inlet 148 and the open end 206 of the exposed end portion 204. Stated another way, the pre-mix tube 202 extends substantially axially between the inlet portion 140, the intermediate portion 142, and the exposed end portion 204.

As shown in FIG. 7, the pre-mix tube 202 includes an inner surface 158 that defines an inner diameter $D_1$ of the tube channel 152 and the opposite outer surface 160. The inner diameter $D_1$ may be substantially constant along the axial length of the pre-mix tube 118, that is, between the inlet 148 and the outlet 150, prior to the outlet portion 144 becoming damaged and/or removed. In the pre-mix tube 202, the exposed end portion 204 defines a radially-extending repair end surface 208 that is adjacent to the open end 206 and opposite the radially-extending end surface 162 adjacent the inlet 148. The end surface 208 extends radially-inwardly from the outer surface 160 and extends from the inner surface 158 at an angled surface 210 that tapers inwardly towards the inner surface 158. The angled surface 210 is oriented at an oblique angle $\alpha_1$ relative to the inner surface 158 such that the inner diameter $D_1$ of the tube channel 152 is increased increase to an inner diameter $D_2$ at the open end 206. The angle $\alpha_1$ may be any suitable oblique angle that enables increasing the inner diameter $D_1$ at the inner surface 158 to the inner diameter $D_2$ at the open end 206. For example, in one embodiment, the angle $\alpha_1$ may be between about 5° to about 60°, between about 5° to about 30°, between about 5° to about 20°, between about 5° to about 10°, between about 100 to about 30°, between about 100 to about 20°, between about 200 to about 60°, between about 200 to about 45°, between about 200 to about 30°, between about 300 to about 60°, between about 300 to about 45°, or between about 450 to about 60°. The outer surface 160 defines an outer diameter $D_3$ at the open end 206. The diameter $D_3$ may be substantially constant across the axial length of the pre-mix tube 202, or the diameter $D_3$ may vary along the axial length of the pre-mix tube 202.

The angled surface 210 may be formed by machining the inner surface 158 of the pre-mix tube 202 at the open end 206. Suitable techniques for machining the inner surface 158 to form the angled surface 210 include, for example, electrical discharge machining (EDM), milling, hand grinding, and/or any other suitable machining technique. The inner surface 158 may be machined to form the angled surface 210 during, and/or after, removing the damaged outlet portion 144 to form the exposed end portion 204.

The tube tip 200 includes a mating end 212 and an opposite outlet end 214. The tube tip 200 is open at both ends 212 and 214 and defines a tube tip channel 216 that extends therebetween. Similar to the removed outlet portion 144 of the pre-mix tube 118, the tube tip 200 may extend from the intermediate portion 142 towards the combustion chamber 50 (FIG. 2) when fuel injector 100 is assembled with the tube tip 200 fixedly coupled or secured to the pre-mix tube 202. In the exemplary embodiment, the mating end 212 of the tube tip 200 defines a socket 218 that is sized and shaped to receive the exposed end portion 204 of the corresponding pre-mix tube 202. For example, the socket 218 defines an inner diameter $D_4$ that is approximately equal to, or slightly wider than, the outer diameter $D_3$ to enable the end portion 204 of the pre-mix tube 202 to be received in the socket 218. The socket 218 extends axially across the end portion 204 with respect to an axial centerline 220 of the pre-mix tube 202 and/or the tube tip 200. When the end portion 204 of the pre-mix tube 202 is received by the socket 218, the tube channel 152 is axially aligned with the tube tip channel 216 along the axial centerline 220. The inlet 140 of the pre-mix tube 202 is provided in fluid communication with the open outlet end 214 of the tube tip 200.

The tube tip channel 216 is defined by an inner surface 222 that extends substantially axially between the outlet end 214 and a collar 224 of the tube tip 200. An inner diameter $D_5$ of the tube tip channel 216 extends across the inner surface 222. The inner diameter $D_5$ of the tube tip channel 216 may be approximately equal to the diameter $D_1$ of the tube channel 152. The collar 224 provides an angled surface 226 that extends between the inner surface 222 and a collar surface 228 and that tapers inwardly from the collar surface 228 to the inner surface 222. The collar surface 228 extends radially between the angled surface 226 and an inner socket surface 230. The radially-extending end surface 208 is located adjacent to, and may abut, the collar surface 228 when the end portion 204 of the pre-mix tube 202 is received by the socket 218. The inner diameter $D_4$ of the socket 218 may be approximately equal to, or slightly wider than, the outer diameter $D_3$ of the end portion 204 such that, when the socket 218 receives the end portion 204, the outer surface 160 of the end portion 204 is adjacent to and/or abuts the inner socket surface 230.

The angled surface 226 of the collar 224 is oriented at an oblique angle $\alpha_2$ relative to the inner surface 222 which causes the inner diameter $D_5$ of the tube tip 200 to increase to the inner diameter $D_2$ at the radially-inward edge of the collar surface 228. The angle $\alpha_2$ may be any suitable oblique angle that causes the increase from the inner diameter $D_5$ at the inner surface 222 of the tube tip channel 216 to the inner diameter $D_2$. For example, the angle $\alpha_2$ may be between about 5° to about 60°, between about 5° to about 30°, between about 5° to about 20°, between about 5° to about 10°, between about 100 to about 30°, between about 100 to about 20°, between about 200 to about 60°, between about 200 to about 45°, between about 200 to about 30°, between about 300 to about 60°, between about 300 to about 45°, or between about 450 to about 60°. In some examples, where the inner diameter $D_5$ is approximately equal to the inner diameter $D_1$ of the tube channel 152, the angles $\alpha_1$ and $\alpha_2$ of the angled surfaces 210 and 226 are approximately the same, relative to the respective inner surfaces 158 and 222.

As shown in FIG. 7, when the end portion 204 of the pre-mix tube 202 is received by the socket 218, the angled surfaces 210 and 226 complement each other and create a substantially mirror-image taper at the junction 232 of the end surface 208 and the collar surface 228. In particular, at the junction 232, the inner diameter $D_2$ of the fixedly coupled or secured pre-mix tube 202 and tube tip 200 increases from the inner diameter $D_1$ within the tube channel 152 and then decreases to the inner diameter $D_5$ in the tip tube channel 216. Stated differently, the tapered surfaces 210 and 226 provide the increased inner diameter $D_2$ of the fixedly coupled pre-mix tube 202 and tube tip 200 at the junction 232 of the end surface 208 and the collar surface 228.

Increasing to the inner diameter $D_2$ of the fixedly coupled or secured pre-mix tube 202 and tube tip 200 at the junction 232 facilitates reducing or eliminating the likelihood for the connection between the pre-mix tube 202 and the tube tip 200 to impede or restrict flow of the combustible mixture therethrough, which may otherwise interrupt combustion flame within the combustion chamber 50 (FIG. 2) and/or degrade flame holding within the combustor 20. For example, techniques used to fixedly secure the tube tip 200 to the pre-mix tube 202 (e.g., furnace brazing, induction brazing, orbital welding, laser welding, friction welding, electron beam welding, diffusion bonding, plasma spraying, thermally resistant adhesive, adhesive cladding, high velocity oxy-fuel coating spraying, and/or any other known technique that enables pre-mix tube 202 to function as described herein) may introduce and undesirably cause filler material used to join the components to accumulate within the tube channel 152 and/or the tube tip channel 216. The accumulated material may otherwise impede or restrict flow or otherwise create flow perturbations of the combustible mixture. However, the increased diameter $D_2$ at the junction 232 provides additional space within the tube channel 152 and/or the tube tip channel 216 for such material to accumulate to facilitate reducing or eliminating the negative effects of the accumulated material on the flow of the combustible mixture through tubes 218.

Moreover, due to manufacturing tolerances, the geometries of the end portion 204 of the pre-mix tube 202 and the collar 224 of the tube tip 200 that is adjacent to the end portion 204 when received by the socket 218 may not completely align which may create an offset in the axial alignment between the pre-mix tube 202 and the tube tip 200. An offset in axial alignment between the pre-mix tube 202 and the tube tip 200 may otherwise impede or restrict flow or otherwise create flow perturbations of the combustible mixture. However, the increased diameter $D_2$ at the junction 232 facilitates reducing or eliminating the negative effect that the offset in the axial alignment between the pre-mix tube 202 and the tube tip 200 may otherwise have on the flow of the combustible mixture therethrough. In this way, one or more pre-mix tubes 202 may be repaired or refurbished with a corresponding tube tip 200 while maintaining the performance, efficiency, and/or longevity of the combustor 20.

Figure 8:
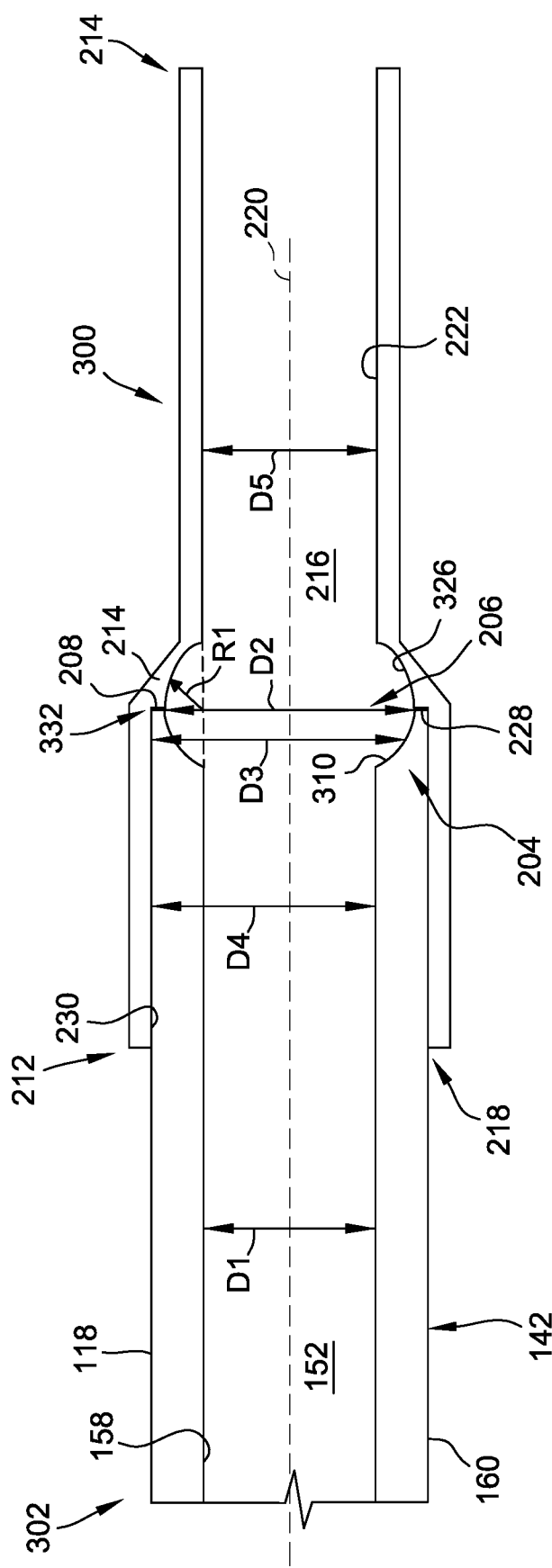
FIG. 8 is an enlarged cross-sectional side view of yet another exemplary tube tip fixedly coupled to a remaining portion of a pre-mix tube after removal and machining operations.

FIG. 8 is an enlarged cross-sectional side view of another exemplary tube tip 300 fixedly coupled or secured to a remaining portion 302 of a pre-mix tube 118. The remaining portion 302 of the pre-mix tube 118 is also referred to as a pre-mix tube 302. The tube tip 300 includes similar features and components as the tube tip 200 and the pre-mix tube 302 includes similar features and components as the pre-mix tube 202 described above with reference to FIG. 7. Corresponding references characters are used in FIGS. 7 and 8 to indicate corresponding parts. In this embodiment, the inner surface 158 of the pre-mix tube 302 is machined to include a concave surface 310 extending between and joining the end surface 208 and the inner surface 158. Like the angled surface 210 of the pre-mix tube 202, the concave surface 310 causes the inner diameter $D_1$ of the tube channel 152 to increase to the inner diameter $D_2$ at the open end 206. The concave surface 310 may be formed by machining the inner surface 158 of the pre-mix tube 302 at the open end 206. Suitable techniques for machining the inner surface 158 to form the concave surface 310 include, for example, electrical discharge machining (EDM), milling, hand grinding, and/or any other suitable machining technique. The inner surface 158 may be machined to form the concave surface 310 during and/or after removing the damaged outlet portion 144 to form the exposed end portion 204.

The collar 224 of the tube tip 300 provides a concave surface 326 that joins the inner surface 222 and the collar surface 228. Like the angled surface 226 of the tube tip 200, the concave surface 326 causes the inner diameter $D_5$ of the tube tip 300 to increase to the inner diameter $D_2$ at the radially-inward edge of the collar surface 228. When the end portion 204 of the pre-mix tube 302 is received by the socket 218 of the tube tip 300, the concave surfaces 310 and 326 complement each other and create a substantially semi-circular shape having a radius $R_1$ at the junction 332 of the end surface 208 and the collar surface 228. In particular, at the junction 332, the inner diameter $D_2$ of the fixedly coupled or secured pre-mix tube 302 and tube tip 300 increases from the inner diameter $D_1$ within the tube channel 152 and then decreases to the inner diameter $D_5$ in the tip tube channel 216. Stated differently, the concave surfaces 310 and 316 provide the increased inner diameter $D_2$ of the fixedly coupled pre-mix tube 302 and tube tip 300 at the junction 332. As described above, the increased diameter $D_2$ at the junction 332 facilitates reducing or eliminating the opportunity for the connection between the pre-mix tube 302 and the tube tip 300 to impede or restrict flow of the combustible mixture therethrough and enables repairing or refurbishing one or more pre-mix tubes 302 with a corresponding tube tip 300 while maintaining the performance, efficiency, and/or longevity of the combustor 20 (FIG. 2).

Figure 9:
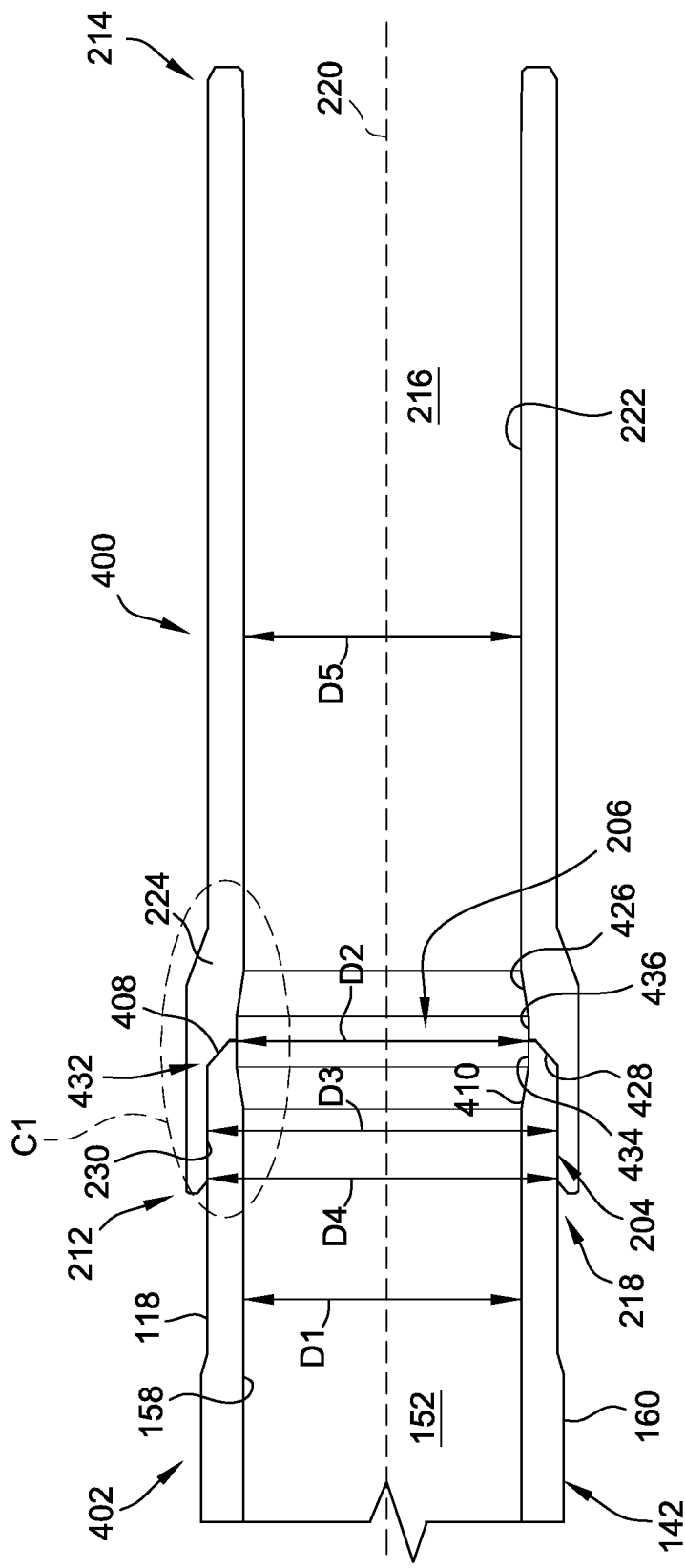
FIG. 9 is an enlarged cross-sectional side view of a further exemplary tube tip fixedly coupled to a remaining portion of a pre-mix tube after removal and machining operations.

FIG. 9 is an enlarged cross-sectional side view of another exemplary tube tip 400 fixedly secured or coupled to a remaining portion 402 of a pre-mix tube 118. The remaining portion 402 of the pre-mix tube 118 is also referred to as a pre-mix tube 402. The tube tip 400 includes similar features and components as the tube tip 200 and the pre-mix tube 402 includes similar features and components as the pre-mix tube 202 described above with reference to FIG. 7. Corresponding references characters are used in FIGS. 7 and 9 to indicate corresponding parts. In this embodiment, the inner surface 158 of the pre-mix tube 402 is machined to include an angled surface 410 extending between and joining the inner surface 158 and a second inner surface 434 adjacent a radially-extending end surface 408 at the open end 206. The second inner surface 434 is substantially flat. Like the angled surface 210 of the pre-mix tube 202, the angled surface 410 provides the increased inner diameter $D_2$ at the open end 206. The angled surface 410 and the second inner surface 434 may be formed by machining the inner surface 158 of the pre-mix tube 402 at the open end 206. Suitable techniques for machining the inner surface 158 to form the angled surface 410 and the second inner surface 434 include, for example, electrical discharge machining (EDM), milling, hand grinding, and/or any other suitable machining technique. The inner surface 158 may be machined to form the angled surface 410 and the second inner surface 434 during and/or after removing the damaged outlet portion 144 to form the exposed end portion 204.

The collar 224 of the tube tip 400 provides an angled surface 426 that joins the inner surface 222 and a second inner surface 436 adjacent a radially-extending collar surface 428. The second inner surface 436 is substantially flat. Like the angled surface 226 of the tube tip 200, the angled surface 426 provides the increased inner diameter $D_2$ at the radially-inward edge of the collar surface 428.

When the end portion 204 of the pre-mix tube 402 is received by the socket 218 of the tube tip 400, the angled surfaces 410 and 426 and corresponding second inner surfaces 434 and 436 complement each other and create a substantially mirror-image taper at the junction 432 of the end surface 408 and the collar surface 428. In particular, at the junction 432, the inner diameter $D_2$ of the fixedly coupled pre-mix tube 402 and tube tip 400 increases from the inner diameter $D_1$ and then decreases to the inner diameter $D_5$. Alternatively stated, the angled surfaces 410 and 426 provide the increased inner diameter $D_2$ of the fixedly coupled pre-mix tube 402 and tube tip 400 at the junction 432. As described above, the increased diameter at the junction 432 facilitates reducing or eliminating the opportunity for the connection between the pre-mix tube 402 and the tube tip 400 to impede or restrict flow of the combustible mixture therethrough and enables repairing or refurbishing one or more pre-mix tubes 402 with a corresponding tube tip 400 while maintaining the performance, efficiency, and/or longevity of the combustor 20 (FIG. 2).

Figure 10:
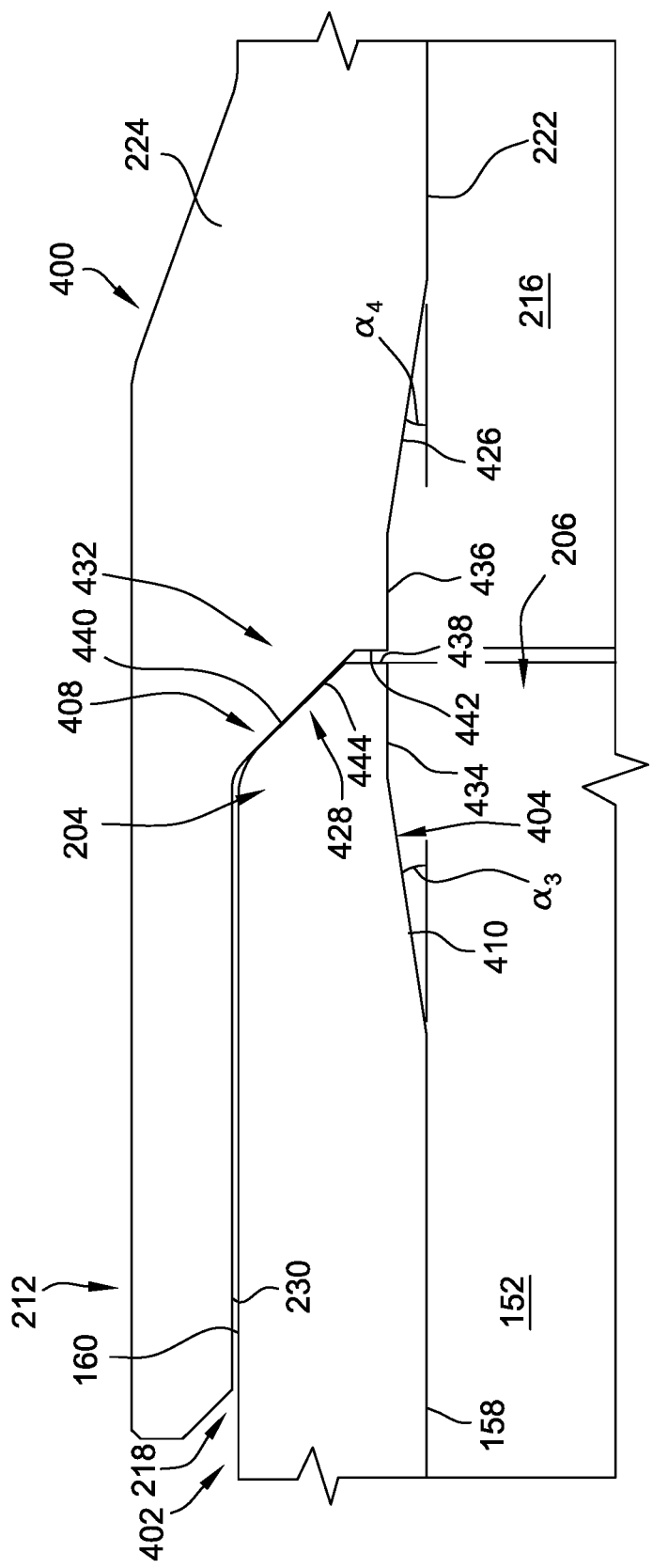
FIG. 10 is a magnified view of the section $C_1$ indicated in dotted lines on FIG. 9.

FIG. 10 is a magnified view of the section $C_1$ in FIG. 9 indicated in dotted lines. FIG. 10 depicts the junction 432 and the corresponding features of the end surface 408 of the pre-mix tube 402 and the collar surface 428 of the tube tip 400 in greater detail. The angled surface 410 of the pre-mix tube 402 is oriented at an oblique angle as relative to the inner surface 158 and the angled surface 426 of the tube tip 400 is oriented at an oblique angle $\alpha_4$ relative to the inner surface 222. The angles $\alpha_3$ and $\alpha_4$ may be any suitable oblique angle to respectively increase from the inner diameter $D_1$ at the inner surface 158 and from the inner diameter $D_5$ at the inner surface 222 to the inner diameter $D_2$ at the junction 432. For example, the angles $\alpha_3$ and $\alpha_4$ may each be between about 5° to about 60°, between about 5° to about 30°, between about 5° to about 20°, between about 5° to about 10°, between about 100 to about 30°, between about 100 to about 20°, between about 200 to about 60°, between about 200 to about 45°, between about 200 to about 30°, between about 300 to about 60°, between about 300 to about 45°, or between about 450 to about 60°. In some examples, where the inner diameter $D_5$ is approximately equal to the inner diameter $D_1$ of the tube channel 152, the angles $\alpha_3$ and $\alpha_4$ of the angled surfaces 410 and 426 are approximately the same, relative to the respective inner surfaces 158 and 222.

As shown in FIG. 10, the end surface 408 and the collar surface 428 include corresponding centering features to facilitate centering the end portion 204 of the pre-mix tube 402 within the socket 218. The centering features described for the embodiment of FIGS. 9 and 10 may be included in any embodiment, such as in the embodiments described with references to FIGS. 7 and 8, for example. The centering feature of the pre-mix tube 402 is formed in the end surface 408 and includes a substantially flat step surface 438 that extends radially from the surface 434 and a chamfer 440 that joins the outer surface 160 and the step surface 438. The step surface 438 may suitably be formed when removing the damaged end portion 144 from the pre-mix tube 118. The chamfer 440 may be formed by machining the outer surface 160 of the pre-mix tube 402 at the open end 206. Suitable techniques for machining the outer surface 160 to form the chamfer 440 include, for example, electrical discharge machining (EDM), milling, hand grinding, and/or any other suitable machining technique. The outer surface 160 may be machined to form the chamfer 440 during and/or after removing the damaged outlet portion 144 to form the exposed end portion 204.

The corresponding centering feature of the tube tip 400 is formed in the collar surface 428 and includes a substantially flat step surface 442 that extends radially from the surface 436 and a chamfer 444 that joins the inner socket surface 230 and the step surface 442. The chamfers 440 and 444 suitably extend between the respective surfaces at approximately the same angle relative to the outer surface 160 and the inner socket surface 230. For example, the chamfers 440 may each extend at approximately the same angle within a range of between about 200 to about 75°, between about 200 to about 45°, between about 200 to about 30°, between about 300 to about 75°, between about 300 to about 60°, between about 300 to about 45°, between about 450 to about 75°, between about 450 to about 60°, or between about 600 to about 75°.

As described above, when the socket 218 receives the end portion 204, the inner diameter $D_4$ of the socket 218 and the outer diameter $D_3$ of the end portion 204 may be such that the outer surface 160 of the end portion 204 is adjacent to and/or abuts the inner socket surface 230. The centering features formed in the end surface 408 and the collar surface 428 facilitate aligning the end portion 204 within the socket 218 at the junction 432. In particular, when the when the socket 218 receives the end portion 204, the step surfaces 438 and 442 are adjacent to and/or abut each other and the chamfers 440 and 444 are adjacent to and/or abut each other to facilitate radially and axially aligning the end portion 204 within the socket 218. In this way, the end portion 204 of the pre-mix tube 402 may be centered within the socket 218 and the tube channel 152 and tip tube channel 216 may be substantially axially aligned along the axial centerline 220.

Figure 11:
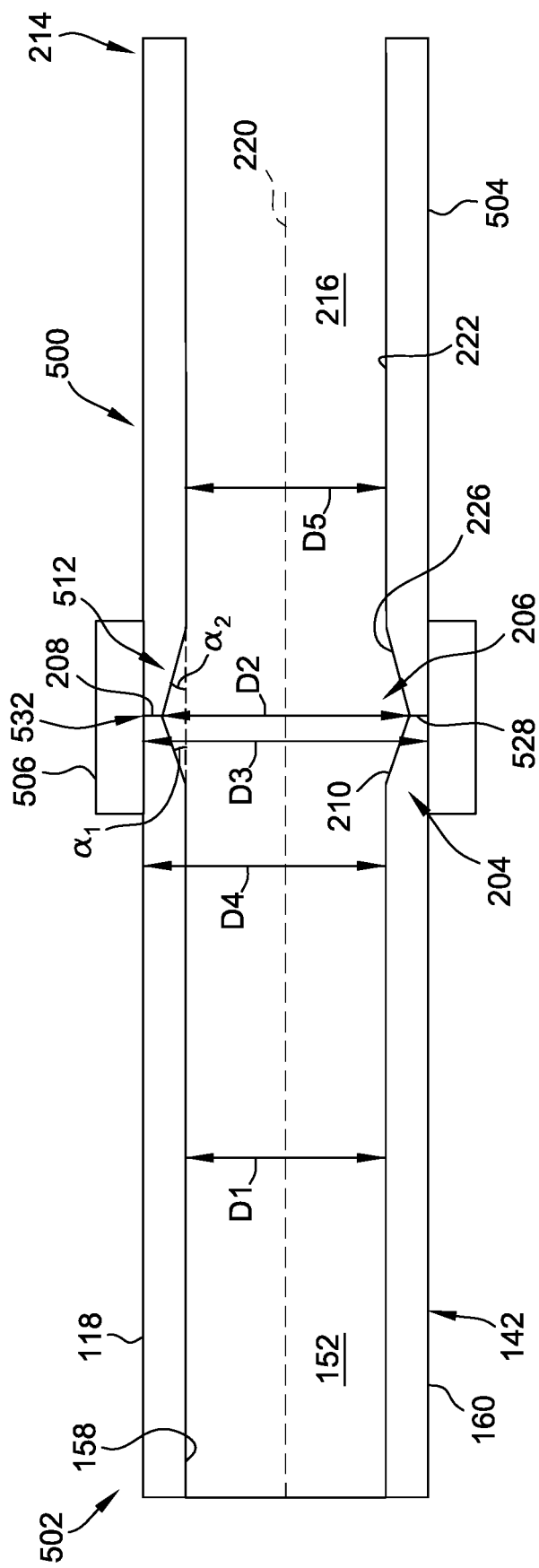
FIG. 11 is an enlarged cross-sectional side view of yet another exemplary tube tip fixedly coupled to a remaining portion of a pre-mix tube after removal and machining operations.

FIG. 11 is an enlarged cross-sectional side view of another exemplary tube tip 500 fixedly secured or coupled to a remaining portion 502 of a pre-mix tube 118. The remaining portion 502 of the pre-mix tube 118 is also referred to as a pre-mix tube 502. The tube tip 500 includes similar features and components as the tube tip 200 and the pre-mix tube 502 includes similar features and components as the pre-mix tube 202 described above with reference to FIG. 7. Corresponding references characters are used in FIGS. 7 and 11 to indicate corresponding parts. In this embodiment, an open mating end 512 of the tube tip 500 does not include a socket 218.

The mating end 512 instead defines a radially-extending end surface 528 that complements and abuts the end surface 208 of the pre-mix tube 502. A coupling sleeve 506 circumferentially surrounds a junction 532 of the end surfaces 208 and 528. The coupling sleeve 506 may be fixedly coupled or secured to the pre-mix tube 502 and/or the tube tip 500 at the junction 532 via brazing, welding, adhesive cladding or by any means and/or process suitable for joining the two components.

As shown in FIG. 11, the end surface 528 of the mating end 512 is joined to the inner surface 222 of the tube tip 500 by the angled surface 226 which, as described above, is oriented at the angle $\alpha_2$ relative to the inner surface 222. The angled surface 226 provides the increased inner diameter $D_2$ at the end surface 528 of the mating end 212. The angled surfaces 210 and 226 complement each other and create a substantially mirror-image taper at the junction 532 of the end surfaces 208 and 528. In particular, at the junction 532, the inner diameter $D_2$ of the fixedly coupled pre-mix tube 502 and tube tip 500 increases from the inner diameter $D_1$ and then decreases to the inner diameter $D_5$. Alternatively stated, the angled surfaces 210 and 226 provide for increasing the inner diameter of the fixedly coupled pre-mix tube 502 and tube tip 500 at the junction 532. As described above, the increased diameter at the junction 532 facilitates reducing or eliminating the opportunity for the connection between the pre-mix tube 502 and the tube tip 500 to impede or restrict flow of the combustible mixture therethrough and enables repairing or refurbishing one or more pre-mix tubes 502 with a corresponding tube tip 500 while maintaining the performance, efficiency, and/or longevity of the combustor 20 (FIG. 2).

A tube tip 156 that may be incorporated into the fuel injector 100 for repairing and/or refurbishing a pre-mix tube 118 may include any or each of the features of the exemplary embodiments illustrated and described herein as tube tip 200, 300, 400, and 500. In addition, the tube tip 156 may include various other tube tip shapes or configurations, and the tube tips 156 should not be limited to the exemplary embodiments described herein. Moreover, the exemplary features described herein for the tube tip 156 and corresponding end portion 204 of a pre-mix tube 118 (e.g., for a tube tip 200, 300, 400, and 500 and a corresponding pre-mix tube 202, 302, 402, and 502) are applicable to any embodiment described herein as well as in any various other shapes or configurations of the tube tip 156 and the corresponding end portion 204 of a pre-mix tube 118 not illustrated. The exemplary embodiments are not limiting in terms of a shape, geometry or other configuration that may be suitably incorporated in the tube tip 156 and corresponding end portion 204 to replace damaged outlet portions 144 of the pre-mix tubes 118 with the tube tips 156 and facilitate the advantages described herein.

Figure 12:
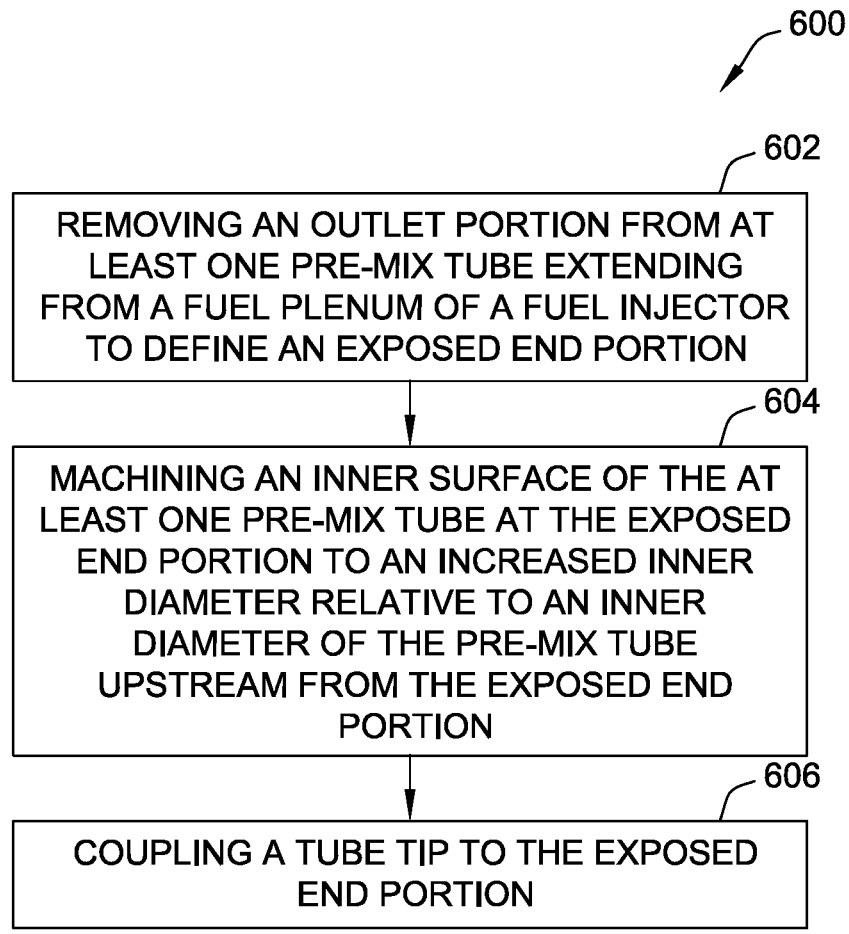
FIG. 12 is an exemplary method 600 of repairing a fuel injector that includes a plurality of pre-mix tubes.

FIG. 12 is an exemplary method 600 of repairing a fuel injector (e.g., the fuel injector 100) that includes a plurality of pre-mix tubes (e.g., the pre-mix tubes 118). The method 600 will be described with additional reference to components illustrated in FIGS. 3-11. The pre-mix tubes 118 extend substantially parallel to one another along or parallel to the axial centerline 106 of the fuel injector 100. Each pre-mix tube 118 includes an inlet portion 140 that extends through the fuel plenum 120, an intermediate portion 142 that extends axially outwardly from the fuel plenum, and an outlet portion 144 that extends axially outwardly from the intermediate portion 142 towards the combustion chamber 50 (FIG. 2). In operation of the fuel injector 100, the outlet portions 144 of the pre-mix tubes 118 are exposed to extreme temperatures and high mechanical loads due to their proximity to the combustion chamber 50 and/or a combustion flame, and may become damaged over time due to thermal stresses and oxidation, for example.

The method 600 includes removing 602 the outlet portion 144 from at least one pre-mix tube 118 to define an exposed end portion 204. Removing 602 the outlet portion 144 may be performed using any suitable means for cutting or otherwise removing tubing. For example, removing 602 the outlet portion 144 may be performed using scoring, electrical discharge machining (EDM), torch cutting, a cutting blade, and the like. Furthermore, removing 602 the outlet portion 144 may include removing 602 the entire outlet portion 144 of the pre-mix tube 118 or removing only part of the outlet portion 144. For example, only a damaged area of the outlet portion 144 may be removed 602. In some implementations of the method 600, the outlet portion 144 of each of the pre-mix tubes 118 of the fuel injector 100 may be removed 602 in a single cutting operation in which the outlet portions 144 of the pre-mix tubes 118 are removed along a cut line 166 (FIG. 5) that extends generally perpendicular to the axial length of the pre-mix tubes 118 and to the axial centerline 106 of the fuel injector 100. In such implementations, after removal 602, the exposed end portions 204 defined in the pre-mix tubes 118 are substantially coextensive and have end surfaces 208 that are substantially flush with one another. In other implementations, the outlet portion 144 of one or some of the pre-mix tubes 118 is removed individually while the outlet portions 144 of other pre-mix tubes 118 are not removed. In some implementations of the method 600, removing 602 the outlet portion 144 may be performed without having to remove a support plate or other fixture from the fuel injector 100. For example, the intermediate and outlet portions 142, 144 of the pre-mix tubes 118 may float or may extend freely outwardly from the fuel plenum 120 without any additional support plate or fixture provided downstream from the shroud 112, thus omitting a need to remove such a fixture prior to removing 602 the outlet portion 144.

The method 600 also includes machining 604 an inner surface 158 of the at least one pre-mix tube 118 at the exposed end portion 204, to an increased inner diameter D2 relative to an inner diameter D1 of the pre-mix tube 118 upstream from the exposed end portion 204. The machining 604 may be performed using any suitable machining technique, such as, for example, electrical discharge machining (EDM), milling, hand grinding, and the like. The machining 604 may produce any suitable geometry of the end portion 204 that defines the increased inner diameter D2 at the exposed end portion 204. In some implementations of the method 600, the machining 604 may produce an inwardly-tapering machined surface (e.g., the angled surface 210 shown in FIGS. 7 and 11, the concave surface 310 shown in FIG. 8, or the angled surface 410 shown in FIGS. 9 and 10) that defines the increased inner diameter D2 at the exposed end portion 204. For example, the exposed end portion 204 may include the angled surface 210 (FIGS. 7 and 11) that extends obliquely between the end surface 208 and the inner surface 158 and that tapers inwardly towards the inner surface 158. The exposed end portion 204 may alternatively include the concave surface 310 (FIG. 8) extending between and joining the end surface 208 and the inner surface 158. The exposed end portion 204 may alternatively include the angled surface 410 (FIGS. 9 and 10) extending obliquely between the inner surface 158 and the second inner surface 434 adjacent the end surface 408. A support plate 168 (FIG. 5) may be temporarily installed onto the at least one pre-mix tube 118 and at least one other pre-mix tube 118 during the machining 604. For example, in implementations of the method 600 in which the intermediate and outlet portions 142, 144 of the pre-mix tubes 118 float or extend freely outwardly from the fuel plenum 120 without any additional support plate or fixture provided downstream from the shroud 112, a support plate 168 may be temporarily installed onto the pre-mix tube 118 being machined 604 along with at least one other pre-mix tube 118 (e.g., at least one adjacent pre-mix tube 118) to facilitate limiting movement of the at least one pre-mix tube 118 during the machining 604.

The method 600 also includes securely coupling 606 the tube tip 156 to the exposed end portion 204. Coupling 606 the tube tip 156 to the exposed end portion 204 may be performed by inserting the exposed end portion 204 into a socket 218 of the tube tip 156 and coupling an outer surface 160 of the exposed end portion 204 to an inner surface 230 of the socket 218. Coupling the tube tip 156 to the exposed end portion 204 may alternatively be performed by surrounding a junction between the tube tip 156 and the exposed end portion 204 with a coupling sleeve 506 and fixedly coupling or securing the coupling sleeve 506 to the tube tip 156 and/or to the exposed end portion 204. The tube tip 156 may be securely coupled 606 to the exposed end portion 204 using any suitable means for joining tubing. For example, the tube tip 156 may be coupled 606 to the exposed end portion 204 by furnace brazing, induction brazing, orbital welding, laser welding, friction welding, electron beam welding, diffusion bonding, plasma spraying, thermally resistant adhesive, adhesive cladding, high velocity oxy-fuel coating spraying, and the like. In some implementations, the coupling 606 may include melting a filler material (e.g., a braze filler material or a welding filler material) to securely couple the tube tip 156 to the exposed end portion 204. The melted filler material may accumulate along the machined surface of the exposed end portion 204 that defines the increased inner diameter $D_2$, thereby facilitating reducing or eliminating the risk for the accumulated material to impede or restrict flow of the combustible mixture therethrough, while maintaining the performance, efficiency, and/or longevity of the combustor 20 (FIG. 2).

After coupling 606 the tube tip 156 to the exposed end portion 204, the pre-mix tube 118 that includes the tube tip 156 suitably extends the same axial length as prior to removing 602 the damaged outlet portion 144. In implementations of the method 600 where the pre-mix tubes 118 are coextensive with one another and the outlet portions 144 thereof are removed 602 in a single cutting operation along the cut line 166, the tube tips 156 coupled 606 to the exposed end portions 204 suitably retain the coextensive extent such that the tube tip 156 define end surface(s) at the outlet ends 214 that are substantially flush with one another. In implementations of the method 600 where the outlet portion 144 of one or some of the pre-mix tubes 118 are removed 602 individually, the tube tip(s) 156 that replace the removed outlet portion(s) 144 may be coextensive with the remaining outlet portions 144 and define end surfaces at the outlet end(s) 214 that are substantially flush with the remaining end surfaces 164.

Coupling 606 the tube tip 156 to the exposed end portion 204 creates a junction (e.g., the junction 232 in FIG. 7, the junction 332 in FIG. 8, the junction 432 in FIGS. 9 and 10, or the junction 532 in FIG. 11) between the tube tip 156 and the exposed end portion 204. The tube tip 156 has a greater inner diameter $D_2$ at the junction than downstream from the junction. That is, the tube tip 156 includes the inner surface 222 that defines the tube tip channel 216 having the inner diameter $D_5$, and the inner diameter $D_2$ of the tube tip 156 at the junction is greater than the inner diameter $D_5$. In the exemplary method, the tube tip 156 and the exposed end portion 204 have the approximately equal inner diameter $D_2$ at the junction. In some implementations of the method 600, the tube tip 156 has an inner surface configuration at the junction that complements the inner surface configuration of the exposed end portion 204. The tube tip may have an inwardly-tapering surface (e.g., the angled surface 226 shown in FIGS. 7 and 11, the concave surface 326 shown in FIG. 8, or the angled surface 426 shown in FIGS. 9 and 10) that extends between the junction and an inner surface 222 of the tube tip 156 to define the greater inner diameter of the tube tip 156 at the junction and that complements the inwardly-tapering machined surface of the exposed end portion 204 produced by the machining 604. For example, the tube tip 156 may include the angled surface 226 (FIGS. 7 and 11) that extends obliquely between the inner surface 222 and a radially-extending surface (e.g., the collar surface 228 in FIG. 7 or the end surface 528 in FIG. 11) and tapers inwardly towards the inner surface 222. The tube tip 156 may alternatively include the concave surface 326 (FIG. 8) that extends between the inner surface 222 and a radially-extending surface (e.g., the collar surface 228 in FIG. 8 or the end surface 528 in FIG. 11). The tube tip 156 may alternatively include the angled surface 426 (FIGS. 9 and 10) extending obliquely between the inner surface 222 and the second inner surface 436 adjacent the radially-extending surface 442. In some implementations, the inner surface configuration of the tube tip 156 and the exposed end portion 204 form a mirror image and respectively increase the inner diameters from $D_1$ in the tube channel 152 and $D_5$ in the tube tip channel 216, which may be approximately the same, to the approximately same inner diameter $D_2$ at the junction.

In some implementations of the method 600, the exposed end portion 204 and the tube tip 156 may be provided with corresponding centering features to facilitate radially and/or axially aligning the exposed end portion 204 and the tube tip 156. The centering feature may be formed in the exposed end portion 204 during the machining 604. For example, in implementations of the method 600 where the exposed end portion 204 is inserted into the socket 218 of the tube tip 156 during the coupling 606, the machining 604 may include machining 604 a chamfer 440 (FIG. 10) that extends between and joins the outer surface 160 and the radially-extending step surface 438 of the exposed end portion 204. The corresponding centering feature of the tube tip 156 may include a chamfer 444 that extends between and joins the inner socket surface 230 and the step surface 442. When the socket 218 receives the end portion 204 during the coupling 606, the step surfaces 438 and 442 are adjacent and/or abut each other and the chamfers 440 and 444 are adjacent and/or abut each other to facilitate radially and axially aligning the end portion 204 within the socket 218.

Exemplary methods described herein include machining an exposed end portion of the pre-mix tube after removing the damaged outlet portion to produce a suitable configuration of the pre-mix tube that facilitates reducing or eliminating the likelihood and risk for the connection between the pre-mix tube and the tube tip to impede or restrict flow of the combustible mixture therethrough. For example, the pre-mix tube may be machined at the exposed end portion to which the tube tip is attached to an increased diameter that provides additional interior space for material to accumulate without creating an obstacle for the combustible mixture flowing through the pre-mix tube and tube tip. The increased diameter also facilitates reducing or eliminating the negative effects that an offset in the axial alignment between the pre-mix tube and tube tip may otherwise have on the flow of the combustible mixture therethrough. In this way, one or more pre-mix tubes may be repaired or refurbished with a corresponding tube tip while maintaining the performance, efficiency, and/or longevity of the combustor.

Further aspects of the present disclosure are provided by the subject matter of the following clauses:

Clause 1. A method of repairing a fuel injector including a plurality of pre-mix tubes that each extend from a fuel plenum to an outlet portion, the method comprising: removing the outlet portion from at least one pre-mix tube to define an exposed end portion; machining an inner surface of the at least one pre-mix tube at the exposed end portion to form an increased inner diameter relative to an inner diameter of the pre-mix tube upstream from the exposed end portion; and coupling a tube tip to the exposed end portion.

Clause 2. The method according to Clause 1, wherein coupling the tube tip to the exposed end portion creates a junction between the tube tip and the exposed end portion, wherein the tube tip has a greater inner diameter at the junction than downstream from the junction.

Clause 3. The method according to Clause 2, wherein the increased inner diameter at the exposed end portion is approximately equal to the inner diameter of the tube tip at the junction.

Clause 4. The method according to any preceding clause, wherein coupling the tube tip to the exposed end portion comprises melting a filler material to securely couple the tube tip to the exposed end portion, wherein the melted filler material accumulates along the inner surface of the junction at the increased inner diameter.

Clause 5. The method according to Clause 4, wherein coupling the tube tip to the exposed end portion comprises one of brazing and welding the tube tip to the exposed end portion using the filler material.

Clause 6. The method according to any preceding clause, wherein machining the inner surface to the increased inner diameter comprises at least one of electrical discharge machining and milling.

Clause 7. The method according to any preceding clause, wherein coupling the tube tip to the exposed end portion comprises inserting the exposed end portion into a socket of the tube tip and coupling an outer surface of the exposed end portion to an inner surface of the socket.

Clause 8. The method according to any preceding clause, wherein coupling the tube tip to the exposed end portion creates a junction between the tube tip and the exposed end portion and further comprises surrounding the junction with a coupling sleeve and fixedly securing the coupling sleeve to at least one of the tube tip and the exposed end portion to thereby securely couple the tube tip to the exposed end portion.

Clause 9. The method according to any preceding clause, further comprising temporarily installing a support plate onto the at least one pre-mix tube and at least one other pre-mix tube to facilitate limiting movement of the at least one pre-mix tube during the machining.

Clause 10. A method of repairing a fuel injector having a plurality of pre-mix tubes that each extend downstream from a fuel plenum to an outlet portion, the method comprising: removing the outlet portion from a pre-mix tube to define an exposed end portion; machining an inner surface of the pre-mix tube at the exposed end portion to produce an inwardly-tapering machined surface that has a greater inner diameter at the exposed end portion than an inner diameter upstream from the exposed end portion; and coupling a tube tip to the exposed end portion to create a junction between the tube tip and the exposed end portion, wherein the tube tip has an inwardly-tapering surface that extends between the junction and an inner surface of the tube tip, and wherein the inwardly-tapering surface of the tube tip complements the inwardly-tapering machined surface to define a larger inner diameter at the junction.

Clause 11. The method according to Clause 10, wherein the inwardly-tapering machined surface includes a first angled surface that is oriented at first oblique angle relative to the inner surface of the pre-mix tube, and the inwardly-tapering surface of the tube tip includes a second angled surface that is oriented at second oblique angle relative to the inner surface of the tube tip.

Clause 12. The method according to Clause 11, wherein the inner surface of the pre-mix tube and the inner surface of the tube tip define approximately the same diameter and the inner diameter at the exposed end portion defined by inwardly-tapering machined surface is approximately the same as the inner diameter of the tube tip at the junction defined by the inwardly-tapering surface.

Clause 13. The method according to Clause 10, wherein the inwardly-tapering machined surface includes a first concave surface, the inwardly-tapering surface of the tube tip includes a second concave surface, and the first and second concave surfaces complement each other and create a substantially semi-circular shape at the junction.

Clause 14. The method according to any one of Clauses 10 to 13, wherein the machining further comprises machining the exposed end portion to produce a centering feature that complements a corresponding centering feature formed in the tube tip and facilitates aligning the exposed end portion and the tube tip at the junction.

Clause 15. The method according to Clause 14, wherein coupling the tube tip to the exposed end portion comprising inserting the exposed end portion into a socket of the tube tip, and wherein the centering feature machined into the exposed end portion includes a first chamfer that abuts a second chamfer formed in the socket of the tube tip at the junction and facilitates aligning the exposed end portion within the socket.

Clause 16. A method of repairing a fuel injector including a plurality of pre-mix tubes that each extend from a fuel plenum to an outlet portion, the method comprising: removing the outlet portions from the plurality of pre-mix tubes along a cut line to define exposed end portions of the plurality of pre-mix tubes; machining an inner surface of each pre-mix tube at the exposed end portion to form an increased inner diameter relative to an inner diameter of the pre-mix tube upstream from the exposed end portion; and coupling a tube tip to each exposed end portion.

Clause 17. The method according to Clause 16, wherein removing the outlet portions from the plurality of pre-mix tubes defines the exposed end portions that are coextensive and have end surfaces that are substantially flush with one another.

Clause 18. The method according to Clause 17, wherein the tube tips coupled to the exposed end portions are coextensive and have end surfaces that are substantially flush with one another.

Clause 19. The method according to any one of Clauses 16 to 18, wherein the plurality of pre-mix tubes freely extend from the fuel plenum such that removing the outlet portions from the plurality of pre-mix tubes is performed without removing a support plate from the fuel injector.

Clause 20. The method according to any one of Clauses 16 to 19, wherein removing the outlet portions from the plurality of pre-mix tubes is performed using a single cutting operation.

The methods and systems described herein are not limited to the specific embodiments described herein. For example, components of each system and/or steps of each method may be utilized independently and separately from other components and/or steps described herein. For example, the method and systems may also be used in combination with other turbine systems, and are not limited to practice only with the gas turbine engines as described herein. Rather, the exemplary embodiment can be implemented and utilized in connection with many other turbine applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of repairing a fuel injector including a plurality of pre-mix tubes that each extend from a fuel plenum to an outlet portion, the method comprising:
    removing the outlet portion from at least one pre-mix tube to define an exposed end portion;
    machining an inner surface of the at least one pre-mix tube at the exposed end portion to form an increased inner diameter relative to an inner diameter of the pre-mix tube upstream from the exposed end portion; and
    coupling a tube tip to the exposed end portion, wherein coupling the tube tip to the exposed end portion creates a junction between the tube tip and the exposed end portion, and wherein an inner diameter of the tube tip increases adjacent the junction to an increased inner diameter at the junction.

2. The method according to claim 1 wherein the increased inner diameter at the exposed end portion is approximately equal to the increased inner diameter of the tube tip at the junction.

3. The method according to claim 1, wherein coupling the tube tip to the exposed end portion comprises melting a filler material to securely couple the tube tip to the exposed end portion, wherein the melted filler material accumulates at the junction along the increased inner diameters of the pre-mix tube and the tube tip.

4. The method according to claim 3, wherein coupling the tube tip to the exposed end portion comprises one of brazing and welding the tube tip to the exposed end portion using the filler material.

5. The method according to claim 1, wherein machining the inner surface to the increased inner diameter comprises at least one of electrical discharge machining and milling.

6. The method according to claim 1, wherein coupling the tube tip to the exposed end portion creates a junction between the tube tip and the exposed end portion and further comprises surrounding the junction with a coupling sleeve and fixedly securing the coupling sleeve to at least one of the tube tip and the exposed end portion to thereby securely couple the tube tip to the exposed end portion.

7. The method according to claim 1, further comprising temporarily installing a support plate onto the at least one pre-mix tube and at least one other pre-mix tube to facilitate limiting movement of the at least one pre-mix tube during the machining.

8. A method of repairing a fuel injector including a plurality of pre-mix tubes that each extend from a fuel plenum to an outlet portion, the method comprising:
    removing the outlet portion from at least one pre-mix tube to define an exposed end portion;
    machining an inner surface of the at least one pre-mix tube at the exposed end portion to form an increased inner diameter relative to an inner diameter of the pre-mix tube upstream from the exposed end portion; and
    coupling a tube tip to the exposed end portion, wherein coupling the tube tip to the exposed end portion comprises inserting the exposed end portion into a socket of the tube tip and coupling an outer surface of the exposed end portion to an inner surface of the socket.

9. The method according to claim 8, wherein coupling the tube tip to the exposed end portion creates a junction between the tube tip and the exposed end portion, and wherein an inner surface of the tube tip adjacent the junction complements the machined inner surface at the exposed end portion.

10. A method of repairing a fuel injector having a plurality of pre-mix tubes that each extend downstream from a fuel plenum to an outlet portion, the method comprising:
    removing the outlet portion from a pre-mix tube to define an exposed end portion;
    machining an inner surface of the pre-mix tube at the exposed end portion to produce an inwardly-tapering machined surface that has a greater inner diameter at the exposed end portion than an inner diameter upstream from the exposed end portion, wherein the inwardly-tapering machined surface includes a first angled surface that is oriented at a first oblique angle relative to the inner surface of the pre-mix tube; and
    coupling a tube tip to the exposed end portion to create a junction between the tube tip and the exposed end portion, wherein the tube tip has an inwardly-tapering surface that extends between the junction and an inner surface of the tube tip, and wherein the inwardly-tapering surface of the tube tip includes a second angled surface that is oriented at a second oblique angle relative to the inner surface of the tube tip and complements the first angled surface of the inwardly-tapering machined surface to define a larger inner diameter at the junction.

11. The method according to claim 10, wherein the inner surface of the pre-mix tube and the inner surface of the tube tip define approximately the same diameter and the inner diameter at the exposed end portion defined by inwardly-tapering machined surface is approximately the same as the inner diameter of the tube tip at the junction defined by the inwardly-tapering surface.

12. A method of repairing a fuel injector having a plurality of pre-mix tubes that each extend downstream from a fuel plenum to an outlet portion, the method comprising:
    removing the outlet portion from a pre-mix tube to define an exposed end portion:
    machining an inner surface of the pre-mix tube at the exposed end portion to produce an inwardly-tapering machined surface that has a greater inner diameter at the exposed end portion than an inner diameter upstream from the exposed end portion; and
    coupling a tube tip to the exposed end portion to create a junction between the tube tip and the exposed end portion, wherein the tube tip has an inwardly-tapering surface that extends between the junction and an inner surface of the tube tip, wherein the inwardly-tapering machined surface includes a first concave surface, the inwardly-tapering surface of the tube tip includes a second concave surface, and the first and second concave surfaces complement each other and create a substantially semi-circular shape that defines a larger inner diameter at the junction.

13. The method according to claim 12, wherein the first and second concave surfaces define approximately the same inner diameter at the junction.

14. A method of repairing a fuel injector having a plurality of pre-mix tubes that each extend downstream from a fuel plenum to an outlet portion, the method comprising:
removing the outlet portion from a pre-mix tube to define an exposed end portion;
machining an inner surface of the pre-mix tube at the exposed end portion to produce an inwardly-tapering machined surface that has a greater inner diameter at the exposed end portion than an inner diameter upstream from the exposed end portion; and
coupling a tube tip to the exposed end portion to create a junction between the tube tip and the exposed end portion, wherein the tube tip has an inwardly-tapering surface that extends between the junction and an inner surface of the tube tip, and wherein the inwardly-tapering surface of the tube tip complements the inwardly-tapering machined surface to define a larger inner diameter at the junction,
wherein the machining further comprises machining the exposed end portion to produce a centering feature that complements a corresponding centering feature formed in the tube tip and facilitates aligning the exposed end portion and the tube tip at the junction.

15. The method according to claim 14, wherein coupling the tube tip to the exposed end portion comprising inserting the exposed end portion into a socket of the tube tip, and wherein the centering feature machined into the exposed end portion includes a first chamfer that abuts a second chamfer formed in the socket of the tube tip at the junction and facilitates aligning the exposed end portion within the socket.

16. A method of repairing a fuel injector including a plurality of pre-mix tubes that each extend from a fuel plenum to an outlet portion, the method comprising:
removing the outlet portions from the plurality of pre-mix tubes along a cut line to define exposed end portions of the plurality of pre-mix tubes;
machining an inner surface of each pre-mix tube at the exposed end portion to form an increased inner diameter relative to an inner diameter of the pre-mix tube upstream from the exposed end portion; and
coupling a tube tip to each exposed end portion,
wherein the method further comprises temporarily installing a support plate onto at least some of the plurality of pre-mix tubes to facilitate limiting movement of the plurality of pre-mix tubes during at least one of removing the outlet portions and machining the inner surface of each pre-mix tube.

17. The method according to claim 16, wherein removing the outlet portions from the plurality of pre-mix tubes defines the exposed end portions that are coextensive and have end surfaces that are substantially flush with one another.

18. The method according to claim 17, wherein the tube tips coupled to the exposed end portions are coextensive and have end surfaces that are substantially flush with one another.

19. The method according to claim 16, wherein the plurality of pre-mix tubes freely extend from the fuel plenum such that removing the outlet portions from the plurality of pre-mix tubes is performed without removing a support plate from the fuel injector.

20. The method according to claim 16, wherein removing the outlet portions from the plurality of pre-mix tubes is performed using a single cutting operation.

\* \* \* \* \*